(12) United States Patent
Hagano et al.

(10) Patent No.: US 9,234,602 B2
(45) Date of Patent: Jan. 12, 2016

(54) TANK OPENING-CLOSING DEVICE

(75) Inventors: Hiroyuki Hagano, Aichi-ken (JP);
Masayuki Nakagawa, Aichi-ken (JP)

(73) Assignee: TOYODA GOSEI CO., LTD.,
Aichi-pref. (JP)

( * ) Notice: Subject to any disclaimer, the term of this patent is extended or adjusted under 35 U.S.C. 154(b) by 1536 days.

(21) Appl. No.: 12/309,690

(22) PCT Filed: Jul. 30, 2007

(86) PCT No.: PCT/JP2007/065311
§ 371 (c)(1),
(2), (4) Date: Jan. 27, 2009

(87) PCT Pub. No.: WO2008/013325
PCT Pub. Date: Jan. 31, 2008

(65) Prior Publication Data
US 2009/0188582 A1    Jul. 30, 2009

(30) Foreign Application Priority Data
Jul. 28, 2006    (JP) .................................. 2006-206252

(51) Int. Cl.
*B65B 1/04*    (2006.01)
*B65B 3/00*    (2006.01)
(Continued)

(52) U.S. Cl.
CPC ................. *F16K 24/00* (2013.01); *B60K 15/04* (2013.01); *F02M 37/0011* (2013.01); *B60K 2015/0429* (2013.01); *B60K 2015/0445* (2013.01)

(58) Field of Classification Search
CPC ........... B60K 15/04; B60K 2015/0429; B60K 2015/0445; F16K 24/00; F02M 37/0011
USPC .................................. 141/350, 349, 372, 392
See application file for complete search history.

(56) References Cited

U.S. PATENT DOCUMENTS

| 4,881,655 A | 11/1989 | Jansky et al. |
| 5,435,358 A * | 7/1995 | Kempka et al. ............... 141/312 |

(Continued)

FOREIGN PATENT DOCUMENTS

| EP | 0 296 618 A2 | 12/1988 |
| EP | 1 329 353 A1 | 7/2003 |

(Continued)

OTHER PUBLICATIONS

International Search Report of the International Searching Authority mailed on Sep. 4, 2007 for the corresponding International patent application No. PCT/JP2007/065311.

*Primary Examiner* — Len Tran
*Assistant Examiner* — Steven M Cernoch
(74) *Attorney, Agent, or Firm* — Posz Law Group, PLC

(57) ABSTRACT

The tank opening-closing device is realized with a simple constitution of the opening-closing mechanism equipped with a pressure adjustment valve for regulating the internal pressure of the fuel tank. The opening-closing mechanism is equipped with a gasket provided on the opening peripheral edge part of the inlet of the tank opening forming member, the valve opening-closing mechanism for opening and closing the inlet and also regulating the internal pressure of the fuel tank, and a retraction mechanism that selectively moves the valve opening-closing mechanism to the closing position and the fueling position in conjunction with the fueling gun, The valve opening-closing mechanism has a closing position for opening and closing the inlet and a fueling position retracted from the inlet for which it is possible to supply fuel.

20 Claims, 24 Drawing Sheets

(51) Int. Cl.
  *B67C 3/00* (2006.01)
  *F16K 24/00* (2006.01)
  *B60K 15/04* (2006.01)
  *F02M 37/00* (2006.01)

(56) References Cited

U.S. PATENT DOCUMENTS

| | | | |
|---|---|---|---|
| 5,465,861 A * | 11/1995 | Kunz et al. | 220/260 |
| 5,715,963 A * | 2/1998 | Boll et al. | 220/86.2 |
| 5,732,842 A * | 3/1998 | Krause et al. | 220/254.1 |
| 6,155,316 A | 12/2000 | Benjey | |
| 6,691,750 B1 * | 2/2004 | Foltz | 141/350 |
| 6,866,161 B2 * | 3/2005 | Hagano | 220/259.1 |
| 6,923,224 B1 * | 8/2005 | McClung et al. | 141/350 |
| 6,983,773 B1 * | 1/2006 | Hagano et al. | 141/350 |
| 7,063,113 B2 * | 6/2006 | Ropert et al. | 141/350 |
| 7,182,111 B2 * | 2/2007 | McClung et al. | 141/352 |
| 7,246,642 B2 * | 7/2007 | Foltz et al. | 141/350 |
| 7,302,977 B2 * | 12/2007 | King et al. | 141/367 |
| 7,762,291 B2 * | 7/2010 | Martin et al. | 141/350 |
| 2005/0199315 A1 * | 9/2005 | Scharrer | 141/350 |
| 2006/0032549 A1 * | 2/2006 | McClung et al. | 141/97 |

FOREIGN PATENT DOCUMENTS

| | | |
|---|---|---|
| JP | U-63-6941 | 1/1988 |
| JP | 2-25782 U | 2/1990 |
| JP | U-02-25782 | 2/1990 |
| JP | 2001-047876 A | 2/2001 |
| JP | A-2001-47876 | 2/2001 |
| JP | A-2005-263211 | 9/2005 |
| WO | WO 02/26515 | 4/2002 |

* cited by examiner

US 9,234,602 B2

TANK OPENING-CLOSING DEVICE

CROSS REFERENCE TO RELATED APPLICATIONS

This application is a U.S. national stage application of PCT/JP2007/065311 filed on Jul. 30, 2007, and claims priority to, and incorporates by reference, Japanese Patent Application No. JP2006-206252 filed on Jul. 28, 2006.

TECHNICAL FIELD

The present invention relates to a tank opening-closing device for fueling a fuel tank through a fuel path, and particularly relates to a mechanism for opening and closing the fuel path.

BACKGROUND ART

The inlet of the inlet pipe for fueling an automobile is typically sealed by a fuel cap that is attached and detached by a rotation operation. This kind of fuel cap not only has poor operability because a plurality of rotation operations is required when fueling, but there was also the problem that when removed, it was necessary to come up with a means for remembering the place one left it or for preventing loss. To address this kind of problem, arts for which a flap valve mechanism is provided on the fuel cap are known such as in JP-A 2001-47876. The flap valve mechanism closes the inlet of the inlet pipe using the flap valve and also seals it by biasing using a spring, and during fueling, the inlet opens by pressing the flap valve in resistance to the biasing force of the spring using the fueling gun. Also, a pressure adjustment valve for regulating the internal pressure of the fuel tank is attached to the flap valve mechanism. However, with the flap valve mechanism, when the pressure adjustment valve is attached to the flap valve, not only does the mechanism become complex, but there was also the problem that the number of parts becomes high.

DISCLOSURE OF THE INVENTION

An object of the present invention is to provide a tank opening-closing device with a simple constitution, equipped with an inlet opening-closing mechanism and a valve opening-closing mechanism for regulating the internal pressure of the fuel tank during fueling.

This invention which was created to address the problems noted above, a tank opening-closing device for opening and closing the inlet that supplies fuel to a fuel tank, equipped with:

a tank opening forming member having the inlet, and a fuel path for leading the fuel supplied from a fueling gun to the fuel tank through the inlet, a valve opening-closing mechanism equipped with a valve body, the valve body for opening and closing the inlet and also for regulating the internal pressure of the fuel tank, a gasket for sealing between the valve body and the inlet opening peripheral edge part by being pressed by the inlet opening peripheral edge part and the valve body, and a retraction mechanism for working in conjunction with the fueling gun or an external force and having the valve opening-closing mechanism selectively move to the closing position and the fueling position, wherein the closing position is a position for regulating the internal pressure of the fuel tank by the valve body opening and closing the inlet, and the fueling position is a position at which it is possible to supply fuel with the valve body retracted from the inlet.

With the tank opening-closing device of the present invention, to do fueling, by operating the retraction mechanism using the fueling gun or external force, the valve opening-closing mechanism is moved from the closing position to the fueling position, and fuel from the fueling gun is supplied to the fuel tank through the fuel path.

The valve opening-closing mechanism functions as an opening and closing valve for opening and closing during fueling, and also functions as a pressure adjustment valve that opens when the differential pressure of the fuel tank internal pressure and the outside air exceeds a preset level, so it is not necessary to provide a plurality of valves, and it is possible to reduce the number of parts such as springs and the like.

For the valve opening-closing mechanism, just a gasket is sufficient for the means for sealing the fuel path of the tank opening forming member, so it is possible to decrease the number of parts and also make the constitution simple. In fact, the valve body of the valve opening-closing mechanism uniformly presses the gasket using the spring, so the sealing integrity is excellent. Also, the valve opening-closing mechanism is not pressed by the fueling gun to do the opening operation, so even if there is not an emphasis on mechanical strength and durability, it is sufficient to have a design that emphasizes sealing integrity, making the design easy.

Also, the valve opening-closing mechanism functions as an opening and closing valve that opens and closes during fueling, and also functions as a pressure adjustment valve that opens when the differential pressure of the fuel tank internal pressure and the outside air exceeds a preset level, so it is not necessary to provide a plurality of valves, and it is possible to reduce the number of parts such as springs and the like. As a preferred mode of the valve opening-closing mechanism, it is possible to use a constitution equipped with either a negative pressure valve or a positive pressure valve that opens when the differential pressure of the fuel tank internal pressure and the outside air exceeds a preset level.

As a preferred mode of the invention, the retraction mechanism is constituted so that the inlet opens by the valve body moving in the gasket axial direction, and by the valve body moving in a direction that intersects the axial direction, and it is possible to use a constitution such that the inlet opens by moving the valve body following an arc trajectory. Specifically, the retraction mechanism can have a constitution for which after moving in the valve body axial direction, it moves in the intersecting direction, or moves in the axial direction and the intersecting direction simultaneously. Here, in addition to a direction at a right angle to the axial direction, the intersection direction can also be a diagonal direction. With this constitution, the valve body moves at least in the gasket axial direction when separated from the gasket, so it does not grind with a large force on the gasket, and the gasket durability is excellent.

Also, as a preferred mode of the invention, the valve opening-closing mechanism can have a constitution equipped with a valve support moving body that supports the valve body so as to be able to slide in the opening and closing direction, and a supported mechanism for which the valve support moving body fixed to the tank opening forming member is supported to be able to move in the intersecting direction. With this constitution, the valve body is able to move with a stable stance using the valve support moving body and the supported mechanism. In this case, as a preferred mode of the valve support moving body, it is possible to use a constitution equipped with a cantilever spring that reduces the sliding resistance at the sliding location with the supported mechanism. The cantilever spring is able to obtain smooth movement of the valve opening-closing mechanism by reducing the sliding resistance of the valve support moving body and the supported mechanism, and is also able to prevent a rattling sound due to vibration and the like.

Furthermore, as a preferred mode of the supported mechanism, it is possible to use a constitution equipped with a return spring biasing the valve support moving body from the fueling position toward the stopping position. With the spring, it is possible to return the valve body and the valve support moving body from the fueling position to the stopping position using a simple constitution.

Also, as a preferred mode of the invention, the tank opening forming member is equipped with an opening for inserting the fueling gun, and it is possible to use a constitution for which the retraction mechanism is equipped with a shutter mechanism for opening and closing the opening by the fueling gun or external force, and a linking mechanism for linking to the shutter mechanism and opening and closing the valve opening-closing mechanism. With this constitution, the shutter mechanism closes the opening of the tank opening forming member when not during fueling, so it is possible to prevent dust or the like in the atmosphere from reaching the valve opening-closing mechanism through the opening, and to prevent a decrease in the sealing integrity of the valve opening-closing mechanism.

Furthermore, as a preferred mode of the linking mechanism, it is possible to use a constitution equipped with an operating member that is separated from the valve opening-closing mechanism in a state with the shutter mechanism closed, and that presses the valve opening-closing mechanism in conjunction with the opening operation of the shutter mechanism, and that opens and operates the valve opening-closing mechanism. With this constitution, even when external force is applied to the shutter mechanism by a vehicle collision, the linking mechanism does not exert the external force applied to the shutter mechanism to the valve opening-closing mechanism, so this does not cause a decrease in the sealing integrity of the valve opening-closing mechanism. As a preferred constitution in the case, it is possible to use a constitution for which the operating member is equipped with an arm and a pressing body fixed to one end of the arm, and the valve body is equipped with a pressed part that opens and operates the valve opening-closing mechanism by being pressed by the pressing body.

Also, as a preferred retraction mechanism of the invention, the operating member is equipped with a rotation support part pivoted at the tank opening forming member fixed to one end of the arm, and a sliding body provided between the pressing body and the rotating support unit, and it is possible to have a constitution for which the shutter mechanism is equipped with a slide guide member provided in the shutter mechanism, and the slide guide member works in conjunction with the opening operation of the shutter mechanism, rotates the operating member with the rotating support part as the center while sliding the arm, and has the valve opening-closing mechanism opened and operated by the pressing body. With this constitution, the operating member is supported to be able to slide on the shutter mechanism, so it is possible to simplify the linking mechanism.

Also, as a preferred mode of the tank opening-closing device of the present invention, a tank opening-closing device for opening and closing the inlet that supplies fuel to a fuel tank, is characterized by being equipped with a tank opening forming member having the inlet, and a fuel path for leading the fuel supplied from a fueling gun to the fuel tank through the inlet, a valve opening-closing mechanism equipped with a valve body, a valve support moving body for housing the valve body, and a spring for biasing the valve body toward the gasket, the valve body for opening and closing the inlet and also for regulating the internal pressure of the fuel tank, a gasket for sealing between the valve body and the inlet opening peripheral edge part by being pressed by the inlet opening peripheral edge part and the valve body, and a retraction mechanism having an axis support unit for supporting the valve support moving body to be able to rotate on the inlet opening peripheral edge part, and a spring for biasing in the direction for which the valve body closes the inlet.

The tank opening-closing device of the mode of the present invention has the valve opening-closing mechanism axially supported on the tank opening forming member by the retraction mechanism, and is able to directly exert the external force of a fueling gun, a button or the like on the valve aperture mechanism, so a linking mechanism is unnecessary, and the constitution is simple.

BEST MODES OF CARRYING OUT THE INVENTION

Figure 1:
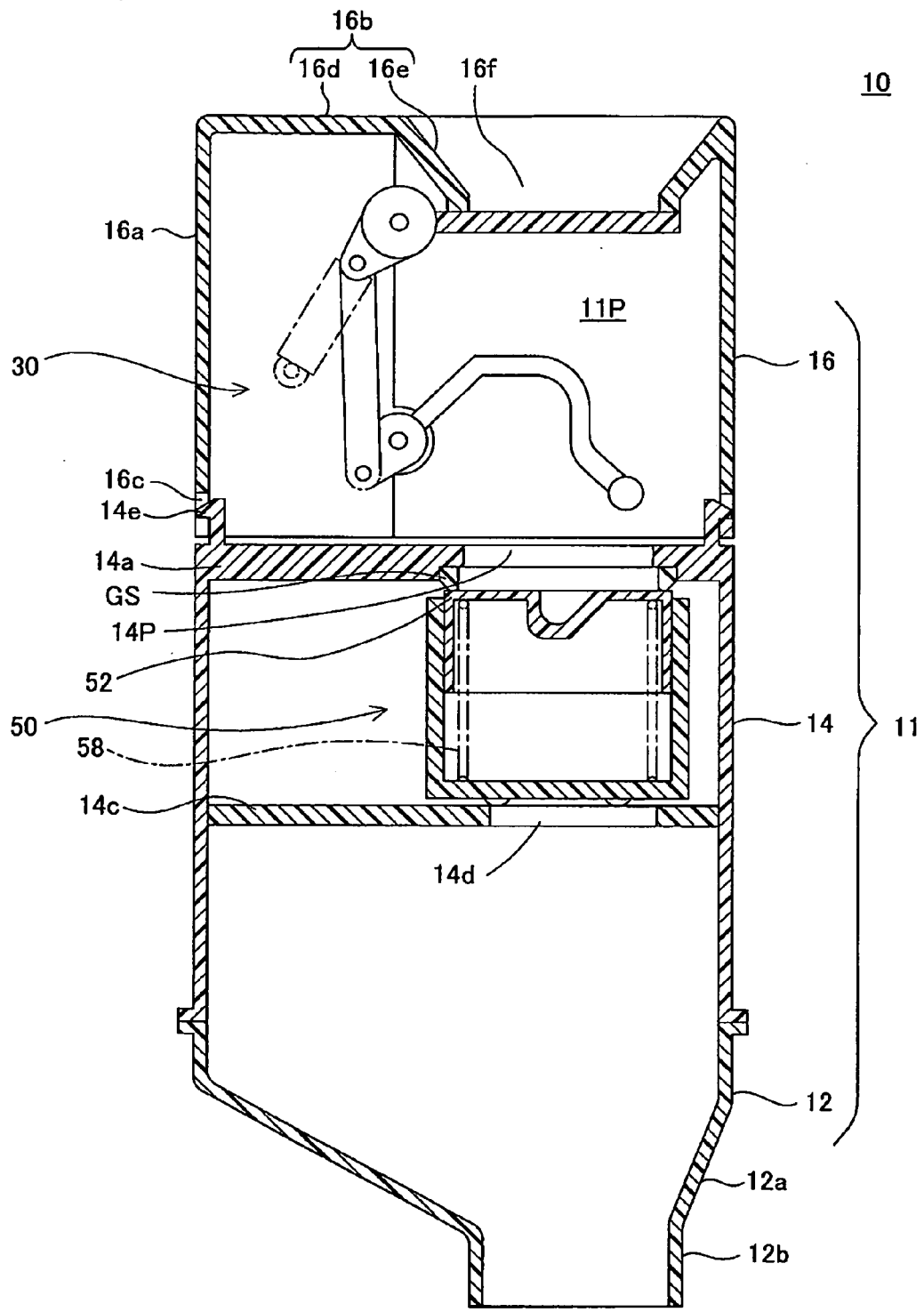
FIG. 1 is a cross section view showing the tank opening-closing device in the axial direction according to the first embodiment of the present invention.

A. First Embodiment
(1) Schematic Constitution of the Tank Opening and Closing Device FIG. 1 is a cross section view of the axial direction of the tank opening-closing device of the first embodiment of the present invention. The tank opening-closing device 10 does not use a fuel cap, and is a mechanism for supplying fuel to the fuel tank, in other words, by opening and closing the fuel path with an external force or the like from a fueling gun after the fueling lid is opened, is a mechanism for supplying fuel to the fuel tank (not illustrated) from the fueling gun. Following, we will describe the detailed constitution of the tank opening-closing device.

(2) Constitution of Each Part

The tank opening-closing device 10 is equipped with the tank opening forming member 11 which has a fuel path 11P connected to the fuel tank, and an opening-closing mechanism 30 for opening and closing the fuel path 11P.

(2)-1 Tank Aperture Forming Member 11

The tank opening forming member 11 is a tube body having the fuel path 11P, and is equipped with a connecting tube 12 connected to the fuel tank, a pipe main unit 14 connected to the top edge part of the connecting tube 12, and the opening forming member 16 fixed to the top part of the pipe main unit 14. The connecting tube 12 is equipped with a reduced diameter part 12a for which the fuel tank side of the pipe main unit 14 is gradually reduced in diameter, and a straight pipe part 12b connected to the reduced diameter part 12a, and these are formed as an integrated unit.

The pipe main unit 14 is connected to the top part of the reduced diameter part 12a. The top part of the pipe main unit 14 has the top wall 14a fixed as an integrated unit. At the top wall 14a, this becomes the inlet 14P that constitutes part of the fuel path 11P. Also, a support wall 14c is fixed inside the fuel path 11P inside the pipe main unit 14. A through hole 14d is formed on the support wall 14c.

The opening forming member 16 is mounted on the top part of the pipe main unit 14, is equipped with a cylindrical side wall part 16a and top wall part 16b, and by engaging an engaging hook 14e formed on the top part of the pipe main unit 14 on an engaging hole 16c on its bottom, it is mounted on the pipe main unit 14. The top wall part 16b of the opening forming member 16 is constituted from a planar part 16d and a slanted surface 16e. The slanted surface 16e has its center part recessed across approximately a half circle, is connected to an opening 16f, and is formed so as to guide the fueling gun.

(2)-2 Opening and Closing Mechanism 30

Figure 2:
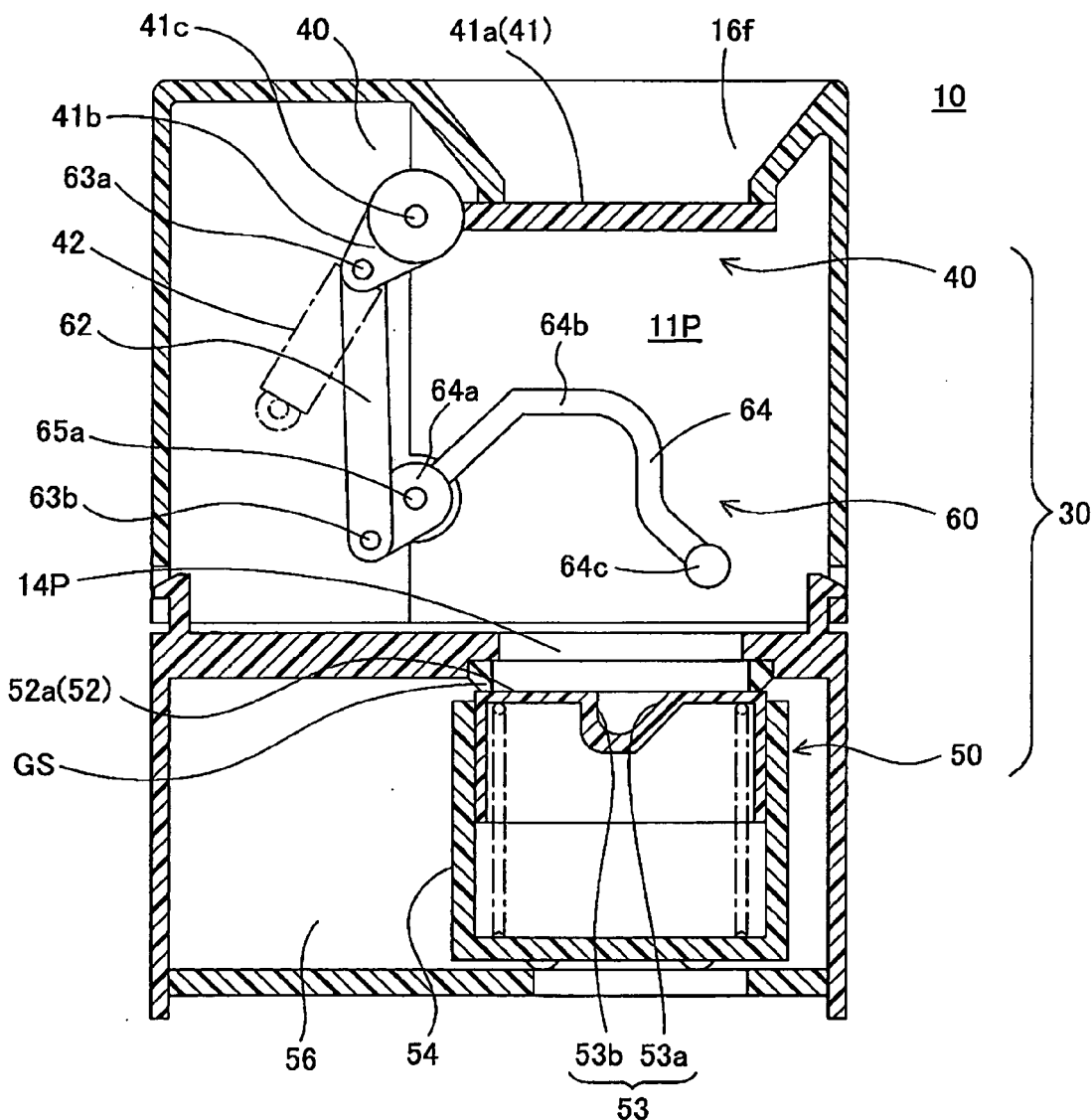
FIG. 2 is a cross section view showing the opening-closing mechanism in the closing position.
Figure 3:
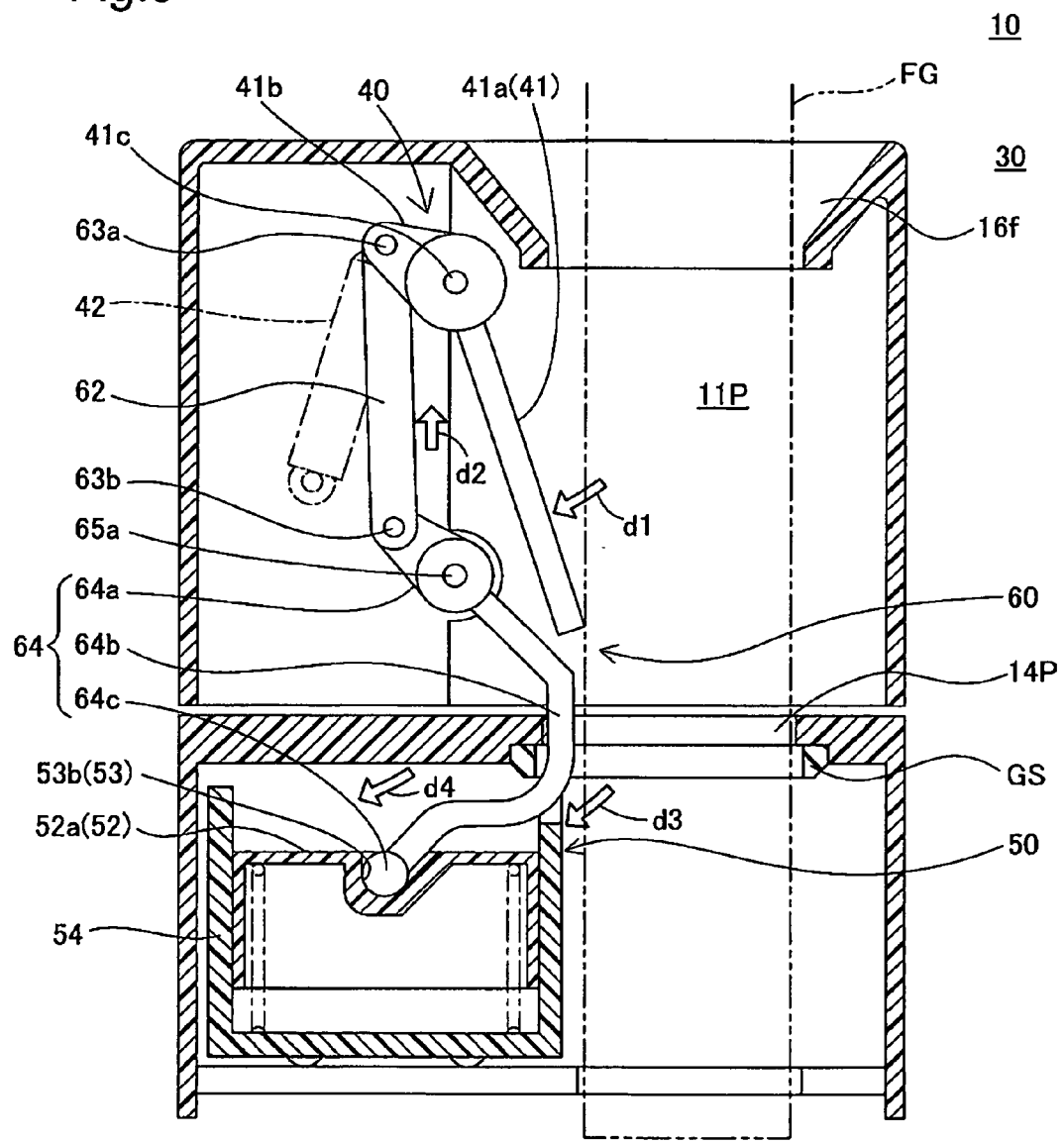
FIG. 3 is a cross section view showing the opening-closing mechanism in the fueling position.

FIG. 2 and FIG. 3 are cross section views showing the opening-closing mechanism 30, with FIG. 2 showing the state with the opening-closing mechanism 30 closed, and FIG. 3 showing the state with the opening-closing mechanism 30 open. In FIG. 2 and FIG. 3, the opening-closing mechanism 30 is equipped with the shutter mechanism 40, the valve opening-closing mechanism 50, and the linking mechanism 60, and during fueling, is a mechanism for which when the fueling lid is opened and the shutter mechanism 40 is pressed open using the fueling gun or the like, the valve opening-closing mechanism 50 opens via the linking mechanism 60 working in conjunction with the shutter mechanism 40, and by opening the fuel path 11P, does fueling. Part of the shutter mechanism 40 and the linking mechanism 60 constitute the retraction mechanism.

Figure 4:
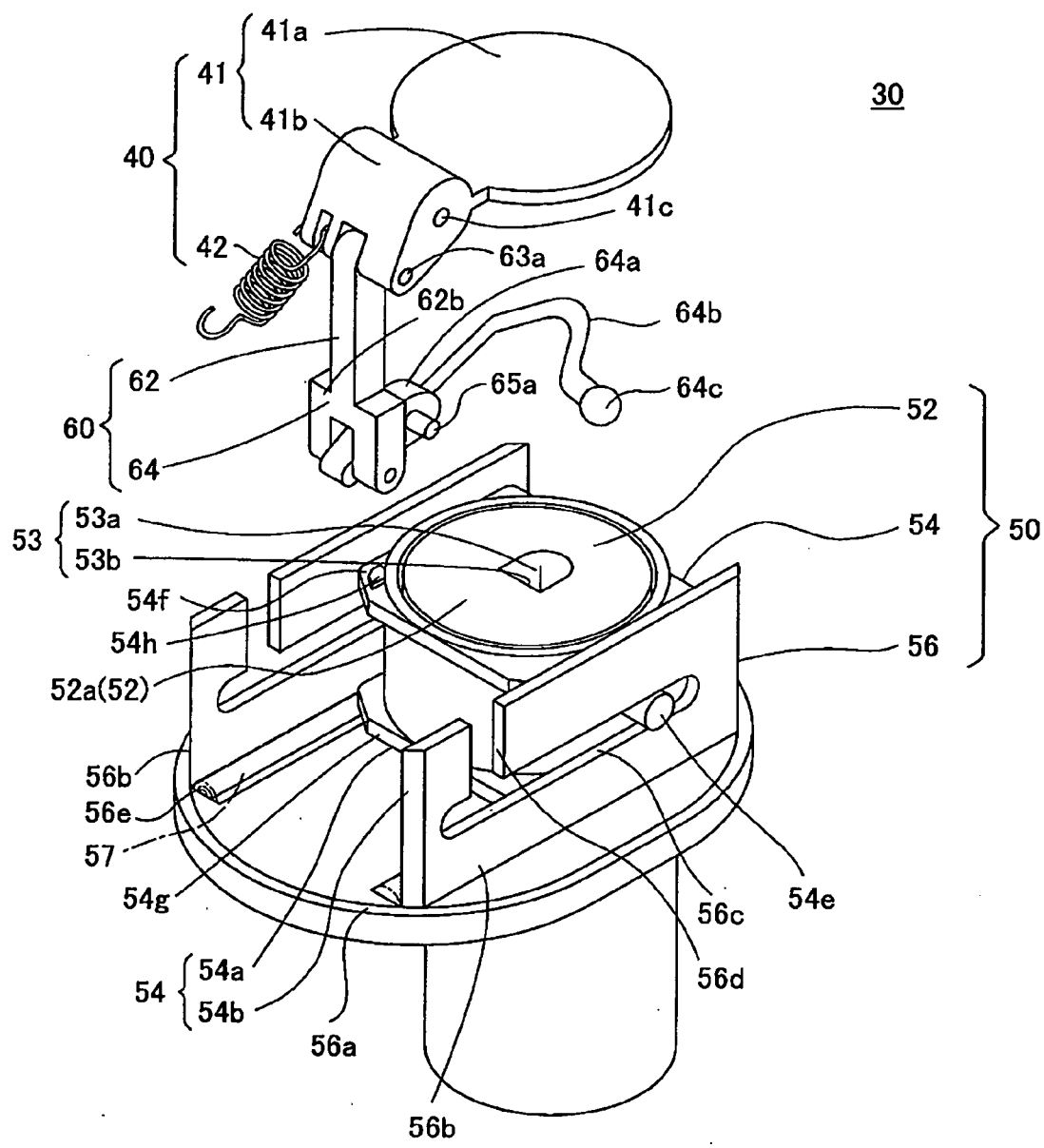
FIG. 4 is a perspective view showing the opening-closing mechanism.
Figure 5:
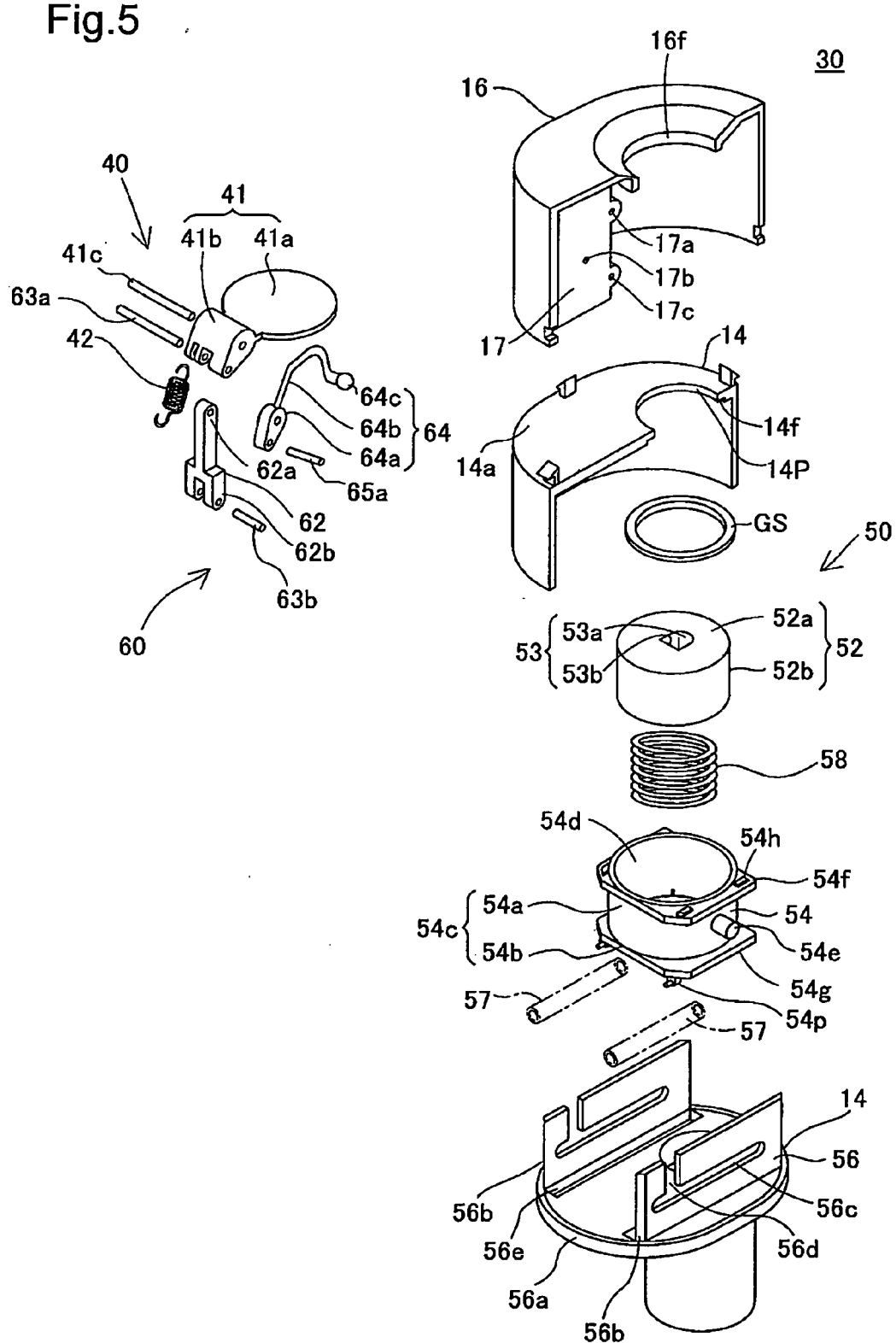
FIG. 5 is a perspective view showing an exploded view of the opening-closing mechanism.

FIG. 4 is a perspective view showing the opening-closing mechanism 30. FIG. 5 is a perspective view showing an exploded view of the opening-closing mechanism 30. The shutter mechanism 40 is equipped with the opening and closing member 41 and the spring 42. The opening and closing member 41 is equipped with a disk part 41a that opens and closes the opening 16f, and a rotation support part 41b formed as an integrated body on the edge part of the disk part 41a. The rotation support part 41b is axially supported via an axis 41c in an axis hole 17a of a support body 17 (one of these is shown in FIG. 5) formed in parallel on the inner wall of the opening forming member 16. The spring 42 is a coil spring which is a bridge between the rotation support part 41b and the engagement hole 17b of the support body 17, and biases the opening and closing member 41 in the closing direction.

The valve opening-closing mechanism 50 is used for both a mechanism for opening and closing the inlet 14P and a mechanism for regulating the pressure inside the fuel tank as a negative pressure valve. The valve opening-closing mechanism 50 is equipped with the valve body 52, the valve support moving body 54, the supported mechanism 56, the springs 57 and 57, the spring 58, and the gasket GS. The valve body 52 is equipped with an upper surface part 52a that forms a sheet surface and is seated and unseated on the gasket GS, and a cylindrical shaped side wall part 52b formed downward from the outer periphery of the top surface part 52a. A pressed part 53 formed in a recess is formed on the top surface part 52a. The pressed part 53 has a curved surface 53a and pressing surface 53b for working in conjunction with the linking mechanism 60.

Figure 6:
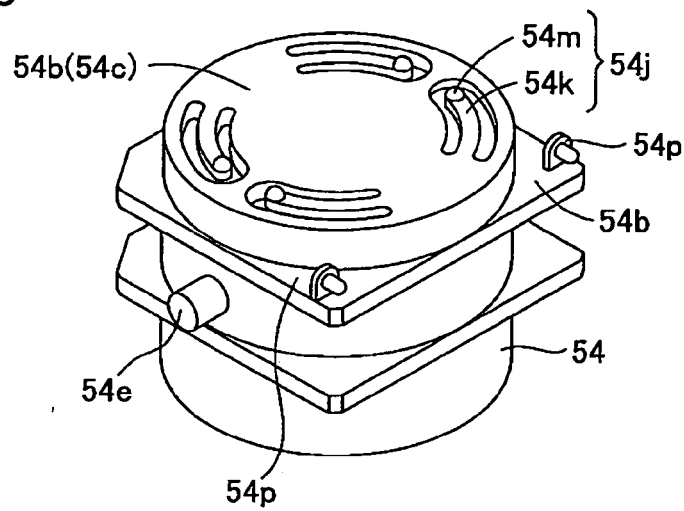
FIG. 6 is a perspective view of the valve support moving body viewed from a downward diagonal.

The valve support moving body 54 is equipped with a cup shaped moving main unit 54c opened upward consisting of a side wall 54a opened upward and a bottom wall 54b, and its inside space becomes a valve housing chamber 54d for housing the valve body 52 and the spring 58. The spring 58 is housed in the valve housing chamber 54d, and biases the valve body 52 upward. At the side wall 54a of the moving main unit 54c are formed the upper guide rib 54f and the lower guide rib 54g which are pulled from both sides in the horizontal direction. The upper guide rib 54f and the lower guide rib 54g are sites for sliding with a stable stance inside the supported mechanism 56. A guide projection 54h is formed facing upward on the top surface of the upper guide rib 54f, and this increases the sliding properties of the pipe main unit 14 in relation to the bottom surface of the top wall 14a. Also, a guide projection 54e guided by the supported mechanism 56 is provided projecting in the radial direction at both sides of the side surface of the moving main unit 54c. FIG. 6 is a perspective view of the valve support moving body 54 viewed from a downward diagonal. Cantilever springs 54j are formed at four locations on the bottom wall 54b of the valve support moving body 54. The cantilever spring 54j is for reducing the sliding resistance with the supported mechanism 56, and this is formed from an arm 54k with part of the bottom wall 54b notched and a projection 54m for which the tip of the arm 54k is projected downward. Also, a spring support projection 54p for pressing the spring 57 (FIG. 5) is provided projecting at both sides of the bottom surface of the moving main unit 54c.

Returning to FIG. 5, the supported mechanism 56 is fixed to the pipe main unit 14 and is supported so that the valve support moving body 54 can slide, and is equipped with a bottom support plate 56a fixed on the inner wall of the pipe main unit 14, and guide side walls 56b and 56b provided projecting so as to face opposite from the top surface of the bottom support plate 56a. A guide groove 56c and an insertion groove 56d are formed on each of the guide side walls 56b. The guide groove 56c is formed along the parallel direction, and by having the follow the guide projection 54e of the valve support moving body 54, the valve support moving body 54 is guided in the horizontal direction. The insertion groove 56d is a groove for inserting the guide projection 54e in the guide groove 56c. Also, return springs 57 and 57 for returning the valve support moving body 54 to its original position are arranged on the inside of the guide side walls 56b and 56b. Each spring 57 is loaded in the housing groove 56e formed at both sides of the top surface of the bottom support plate 56a, and accumulate the return force by pressing the spring support projection 54p of the valve support moving body 54.

The gasket GS is a ring shaped member formed from a rubber material, and is press fit on a seal holding unit 14f formed on the opening peripheral edge part of the inlet 14P of the pipe main unit 14, and closes the inlet 14P in a sealed state by the valve body 52 being pressed by the biasing force of the spring 58.

The linking mechanism 60 opens and operates the valve opening-closing mechanism 50 by transmitting the force of the shutter mechanism 40 to the valve opening-closing mechanism 50, and is equipped with a link rod 62 and the operating member 64. The link rod 62 is equipped with a coupling end 62a supported so that its top end is able to rotate on the rotation support part 41b, and a coupling end 62b so that the other end is connected to be able to rotate on one end of the operating member 64 divided into two prongs. The operating member 64 is a member coupled to the link rod 62 for applying movement force to the valve opening-closing mechanism 50, and is equipped with the rotation support part 64a coupled to the link rod 62, the curved arm 64b fixed to the rotating support unit 64a, and a pressing body 64c as a spherical body formed at the tip of the arm 64b. Specifically, the top edge of the link rod 62 is coupled to the rotation support part 41b of the opening and closing member 41 via the axis 63a, and the bottom edge of the link rod 62 is coupled so as to be able to rotate via the axis 63b to the rotation support part 64a of the operating member 64. The operating member 64 is supported so as to be able to rotate in the axis hole 17c of the support body 17 via the axis 65a by the rotation support part 64a.

(3) Opening and Closing Operation of the Tank Opening and Closing Device

Next, we will describe the operation of the tank opening-closing device 10.

(3)-1 Closed State

Figure 7:
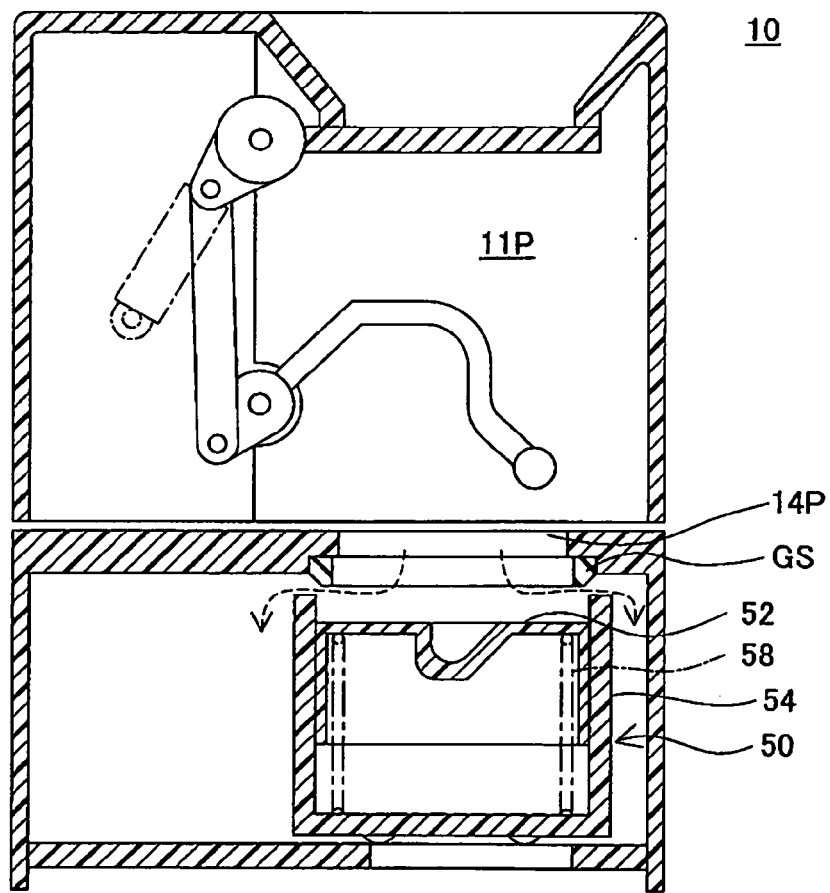
FIG. 7 is an explanatory drawing for explaining the operation of the valve opening-closing mechanism.

In a state with the valve opening-closing mechanism 50 of FIG. 1 closed, with the relationship of the forces applied to the valve body 52 of the valve opening-closing mechanism 50, in other words, the relationship of the force in the opening direction by atmospheric pressure and the force in the closing direction by the tank internal pressure and the spring force of the spring 58, when in a negative pressure state with the former exceeding the latter, as shown in FIG. 7, the valve body 52 moves downward in resistance to the biasing force of the spring 58, is separated from the gasket GS, and a ventilation path is secured therein. Through the ventilation path, the fuel tank is connected to the atmosphere which leads toward the negative pressure state within the fuel tank being eliminated. Then, when the differential pressure applied to the valve body 52 is lower than the biasing force of the spring 58, the valve body 52 closes.

(3)-2 Opening Operation

When the fueling lid is opened, and as shown in FIG. 3, the fueling gun FG is inserted in the opening 16f of the tank opening-closing device 10 and the disk part 41a of the opening and closing member 41 is pressed, the disk part 41a of the shutter mechanism 40 rotates in the clockwise direction d1 in resistance to the spring force of the spring 42 with the axis 41c of the rotation support part 41b as the center. By doing this, the shutter mechanism 40 opens the opening 16f.

At this time, with the linking mechanism 60, when the rotation support part 41b rotates in the clockwise direction, the link rod 62 moves upward to d2 via the axis 63a. By the upward movement of the link rod 62, one end of the operating member 64 is pulled up via the axis 63b. The operating member 64 rotates in the clockwise direction d3 with the axis 65a of the rotation support part 64a as the center. By the rotation of the operating member 64, the pressing body 64c of the tip of the arm 64b is inserted inside the pressed part 53 of the valve body 52. The pressing body 64c presses the pressing surface 53b of the pressed part 53 along with the rotation of the operating member 64, and the valve body 52 is moved by pressing in direction d4 on the circle as an integrated unit with the valve support moving body 54. With the valve support moving body 54, the vertical guide ribs 54f and 54g shown in FIG. 5 are guided along the guide side wall 56b of the supported mechanism 56, and furthermore, the guide projection 54e is guided in the horizontal direction following the guide groove 56c. At the same time as this, the valve opening-closing mechanism 50 is separated by the top surface part 52a of the valve body 52 moving downward at an angle along an arc trajectory in relation to the gasket GS, and moves so as to retract from the inlet 14P. At this time, the valve support moving body 54 accumulates spring force by the spring support projection 54p doing elastic deformation of the spring 57. In this way, by the valve opening-closing mechanism 50 working in conjunction with the shutter mechanism 40 and retracting in the horizontal direction, the inlet 14P is opened, the fueling gun FG is inserted through the inlet 14P, and fueling is done in the fuel path 11P. Specifically, if the opening and closing member 41 of the shutter mechanism 40 is pressed by the fueling gun FG, the valve opening-closing mechanism 50 opens the inlet 14P, so it is possible to do fueling.

(3)-3 Closing Operation

When fueling ends, and the fueling gun FG is removed from the inlet 14P and the opening 16f, the fueling gun FG releases the spring force of the spring 42 via the disk part 41a. By the spring force release, the disk part 41a rotates in the counterclockwise direction with the axis 41c of the rotation support part 41b as the center, the link rod 62 is pulled down, and furthermore, the operating member 64 is moved in the counterclockwise direction. When the operating member 64 rotates in the counterclockwise direction, the pressing body 64 is removed from the pressed part 53 of the valve opening-closing mechanism 50. By doing this, the restoration force of the spring 57 moves the valve support moving body 54 and the valve body 52 of the valve opening-closing mechanism 50 as an integrated unit in the horizontal direction, and the valve body 52 closes the inlet 14P.

(4) Action and Effect of the Tank Opening and Closing Device

The following actions and effects are exhibited by the tank opening-closing device 10 of the embodiment.

(4)-1 The valve opening-closing mechanism 50 functions as an opening and closing valve that opens and closes during fueling, and also functions as a pressure adjustment valve that opens when the differential pressure of the fuel tank internal pressure and the outside air exceeds a preset level, so it is not necessary to provide a plurality of valves, and it is possible to reduce the number of parts such as springs and the like.

(4)-2 The valve opening-closing mechanism 50 can have a reduced number of parts and a simple constitution because a gasket GS alone is sufficient as the means for sealing the inlet 14P of the tank opening forming member 11. In fact, the valve body 52 of the valve opening-closing mechanism 50 has excellent sealing integrity because it uniformly presses the gasket GS using the spring 58.

(4)-3 The valve opening-closing mechanism 50 is not pressed by the fueling gun FG to do the opening operation, so even without a focus on mechanical strength and durability, it is sufficient to use a design that focuses on sealing integrity, so the design is easy.

(4)-4 For fueling, when the disk part 41a of the opening and closing member 41 is pressed by the fueling gun FG being inserted from the opening 16f, the valve opening-closing mechanism 50 opens the inlet 14P by the linking mechanism 60, so it is not necessary to have the valve opening-closing mechanism 50 pressed by the fueling gun FG to open the inlet 14P, so operability is excellent.

(4)-5 When sliding in the horizontal direction, the valve opening-closing mechanism 50 moves slightly in the axial direction of the gasket GS in relation to the gasket GS, so there is no grinding with a large force with the gasket GS, and the gasket GS durability is excellent.

(4)-6 The valve opening-closing mechanism 50 is equipped with the valve support moving body 54 that supports the valve body 52 to be able to slide in the opening and closing direction, and the supported mechanism 56 that supports the valve support moving body 54 to be able to move in the horizontal direction, so the valve body 52 is able to move with a stable stance using the valve support moving body 54 and the supported mechanism 56. Also, as shown in FIG. 6, the cantilever spring 54j of the valve support moving body 54 reduces the sliding resistance of the valve support moving body 54 and the supported mechanism 56 so it is possible to obtain smooth movement of the valve opening-closing mechanism 50, and it is also possible to prevent a rattling sound due to vibration.

(4)-7 The supported mechanism 56 and the spring 57 bias the valve support moving body from the fueling position toward the closing position, so it is possible to return the valve body 52 and the valve support moving body 54 from the fueling position to the closing position using a simple constitution, and it is possible to eliminate the problem of forgetting to close the inlet 14P.

(4)-8 The shutter mechanism 40 closes the opening 16f of the tank opening forming member 11 when not during fueling, so it is possible to prevent dust and the like in the air from reaching the valve opening-closing mechanism 50 through the opening 16f, and it is possible to prevent a decrease in the sealing integrity of the valve opening-closing mechanism 50.

(4)-9 The operating member 64 of the linking mechanism 60 is separated from the valve body 52 of the valve opening-closing mechanism 50 in a state with the shutter mechanism 40 closed, and the outer force applied to the shutter mechanism 40 due to a vehicle collision is not exerted on the valve opening-closing mechanism 50, so there is no bringing on a decrease in sealing integrity of the valve opening-closing mechanism 50.

B. Second Embodiment

Figure 8:
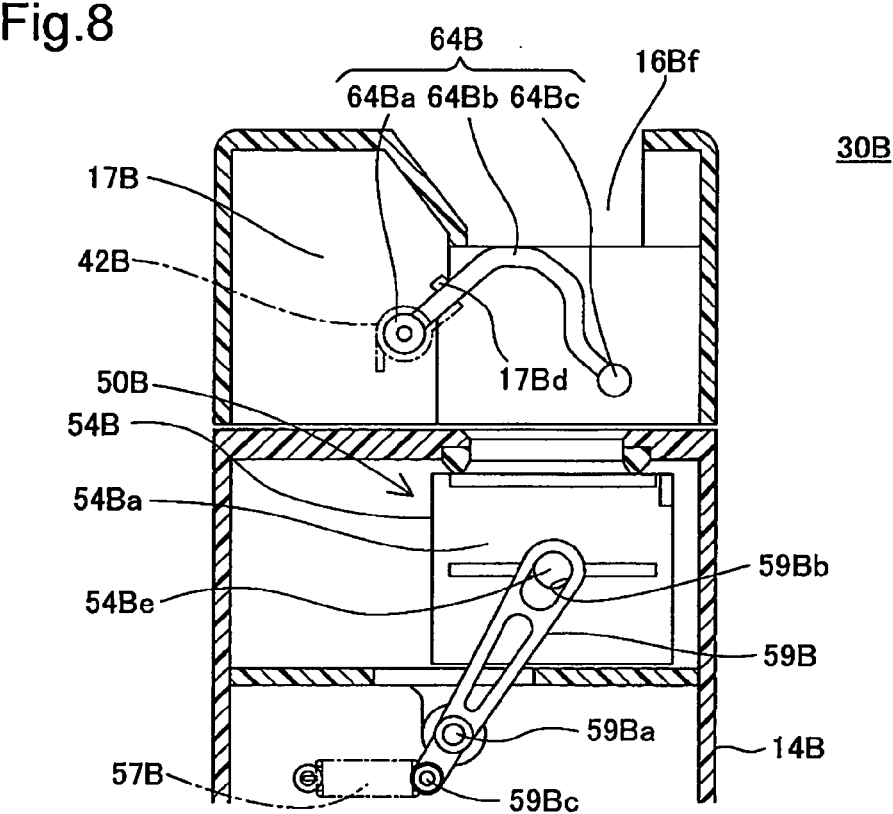
FIG. 8 is a cross section view showing the opening-closing mechanism of the second embodiment.
Figure 9:
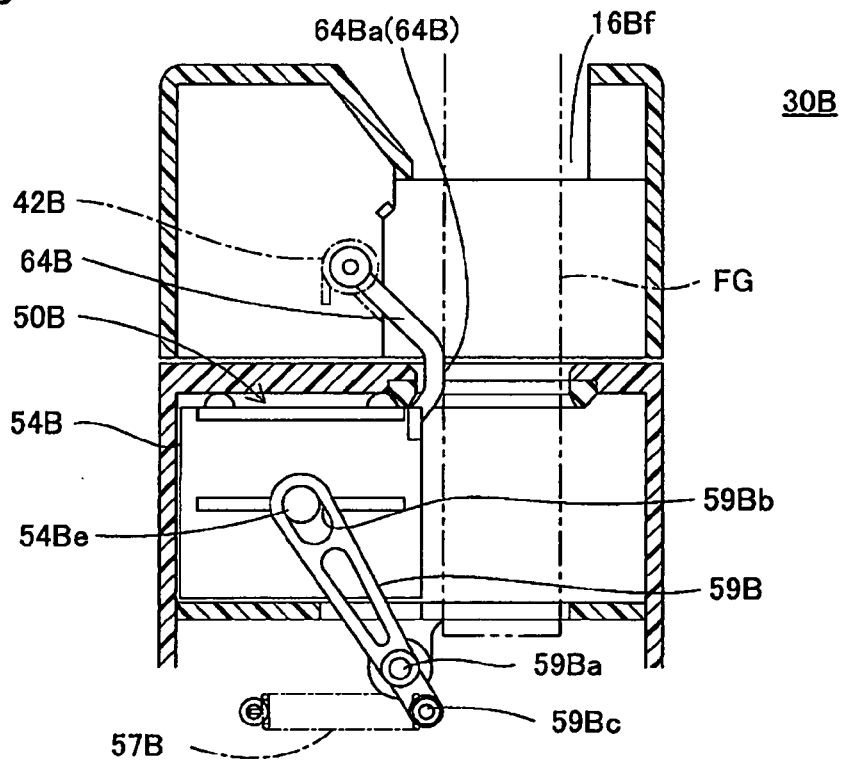
FIG. 9 is an explanatory drawing for explaining the operation of the opening-closing mechanism of FIG. 8.

FIG. 8 and FIG. 9 are cross sections of the second embodiment, with FIG. 8 showing the state when the tank opening-closing device is closed, and FIG. 9 showing the state when the tank opening-closing mechanism is open. The opening-closing mechanism 30B of the embodiment has simplified the shutter mechanism and the linking mechanism constitution, and has a special feature of a spring mechanism that returns the valve opening-closing mechanism 50B. Specifically, the opening-closing mechanism 30B is equipped with an operating member 64B, a spring 42B, and a valve opening-closing mechanism 50B. The operating member 64B has the same shape as the operating member of the first embodiment, and is equipped with the rotating support unit 64Ba, the arm 64Bb, and the pressing body 64Bc. The rotating support unit 64Ba is supported to be able to rotate on the support body 17B, and the arm 64Bb is arranged facing the opening 16Bf. With the operating member 64B, the operating member 64B is biased in the opening 16Bf direction by the spring 42B supported on the support body 17B, and has rotation stopped by the stopper 17Bd formed on the support body 17B.

The valve opening-closing mechanism 50B has the coupling projection 54Be provided projecting on the side wall 54Ba of the valve support moving body 54B. The coupling rod 59B is supported on the pipe main unit 14B so as to be able to rotate with the axis 59Ba as the center. The elongate hole 59Bb of one end of the coupling rod 59B is penetrated by the coupling projection 54Be, and the support end 59B of the other end is fixed to one end of the spring 57B. With this constitution, as shown in FIG. 9, when the fueling gun FG is inserted from the opening 16Bf, the tip of the fueling gun FG presses the arm 64Bb of the operating member 64B, the operating member 64B is rotated in resistance to the biasing force of the spring 42B, and valve support moving body 54B of the valve opening-closing mechanism 50B is moved in the horizontal direction by the pressing body 64Bc (FIG. 8). When the valve support moving body 54B of the valve opening-closing mechanism 50B is moved, the moving force of the valve support moving body 54B rotates the coupling 59B with the axis 59Ba as the center via the coupling projection 54Be and the elongate hole 59Bb, and by doing this, the spring 57B gives spring force for returning.

This embodiment omits the shutter mechanism, and has a simpler constitution by directly operating the operating member 64B with the fueling gun.

C. Third Embodiment

Figure 10:
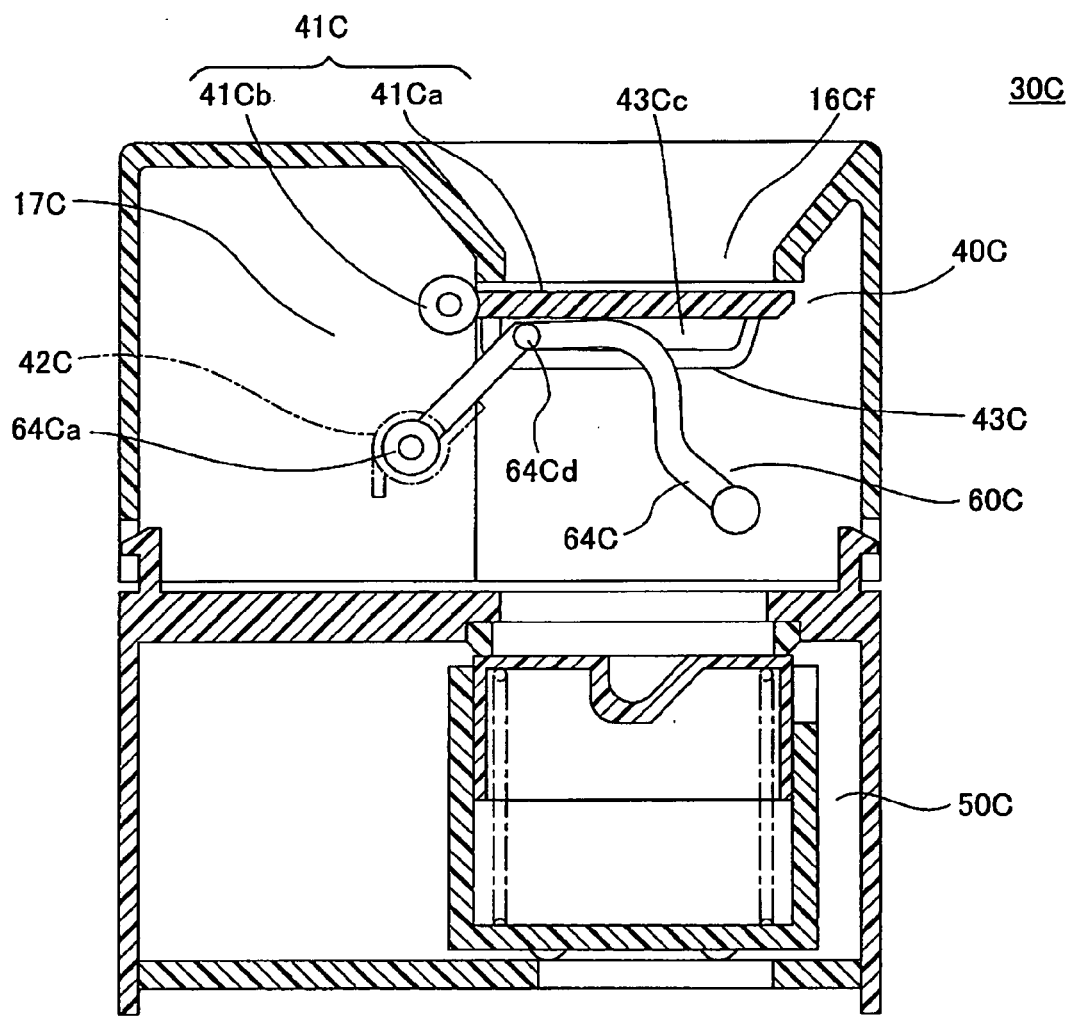
FIG. 10 is a cross section view showing the opening-closing mechanism of the third embodiment.
Figure 11:
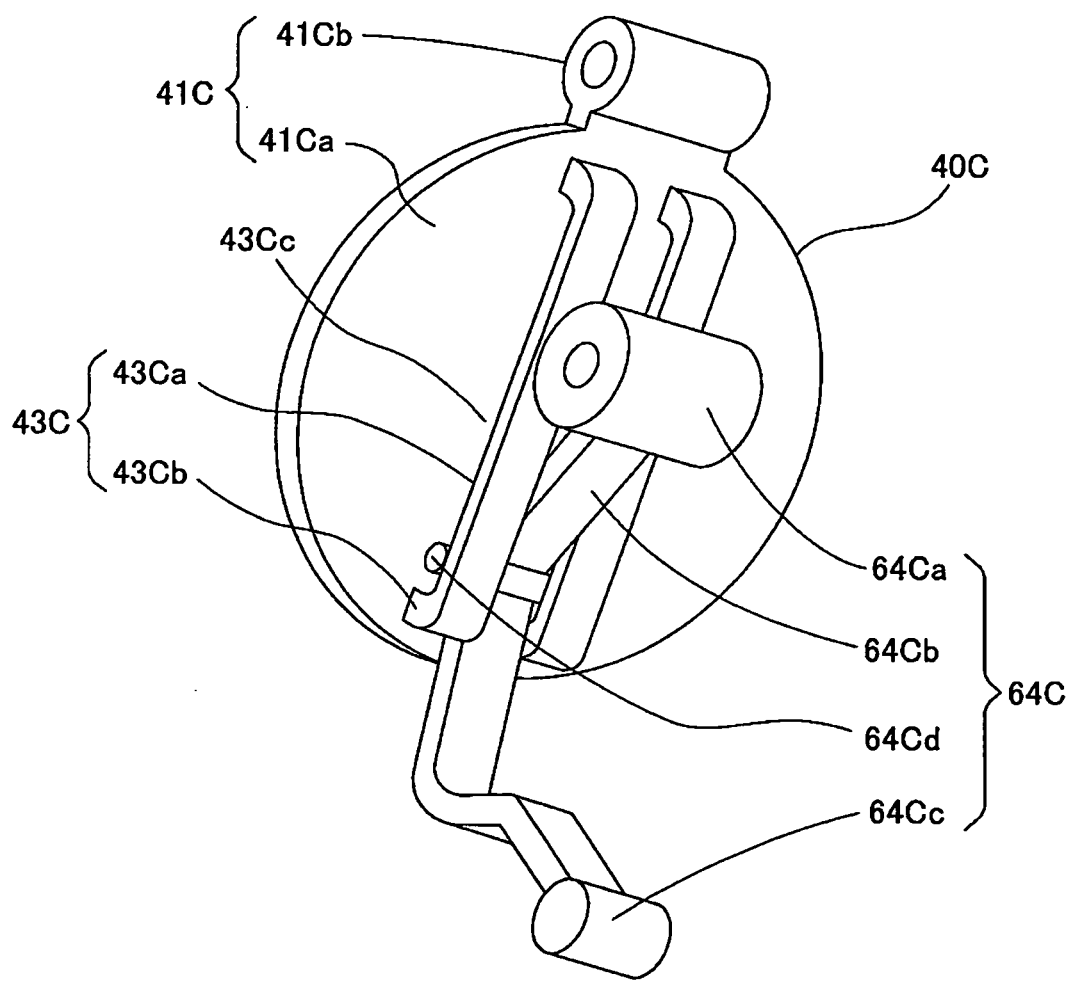
FIG. 11 is a perspective view showing the opening and closing member and the operating member seen from below.

FIG. 10 is a cross section view showing the opening-closing mechanism of the third embodiment. A special feature of the constitution of the opening-closing mechanism 30C of the embodiment is that the constitutions of the shutter mechanism 40C and the linking mechanism 60C is simplified. Specifically, the shutter mechanism 40C is equipped with the opening and closing member 41C. The opening and closing member 41C is equipped with a disk part 41Ca that opens and closes the opening 16Cf, and a rotating support part 41Cb pivoted at the support body 17C at the end part of the disk part 41Ca. The linking mechanism 60C is equipped with an operating member 64C and a spring 42C that biases the spring force in the direction of closing the operating member 64C. FIG. 11 is a perspective view showing the opening and closing member 41C and the operating member 64C seen from below. The operating member 64C has almost the same shape as the operating member 64C of the first embodiment, is equipped with a rotating support part 64Ca, an arm 64Cb, and a pressing body 64Cc, and furthermore, has a sliding body 64Cd provided projecting midway in the arm 64Cb. The rotating support part 64C shown in FIG. 10 is pivoted at the support body 17C. The operating member 64C has the operating member 64C biased in the direction of the opening 16Cf by the spring 42C supported on the support body 17C. Also, a slide guide member 43C is fixed to the back surface of the opening and closing member 41C shown in FIG. 11. The slide guide member 43C is equipped with a guide main unit 43Ca, and a leg part 43Cb bent at both sides of the guide main unit 43Ca, and between the guide main unit 43Ca and the back surface of the opening and closing member 41C is used as a slide gap 43Cc. The slide gap 43Cc has a sliding body 64Cd of the operating member 64C supported in it so as to be able to slide.

Figure 12:
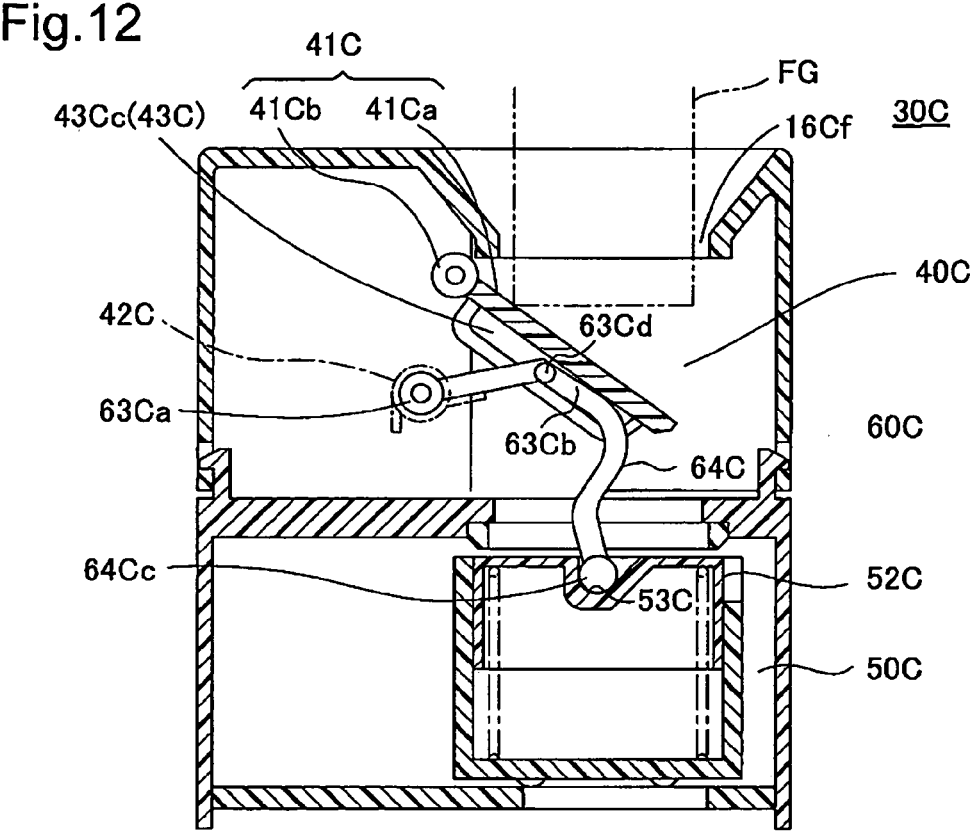
FIG. 12 is an explanatory drawing for explaining the operation of the third embodiment.
Figure 13:
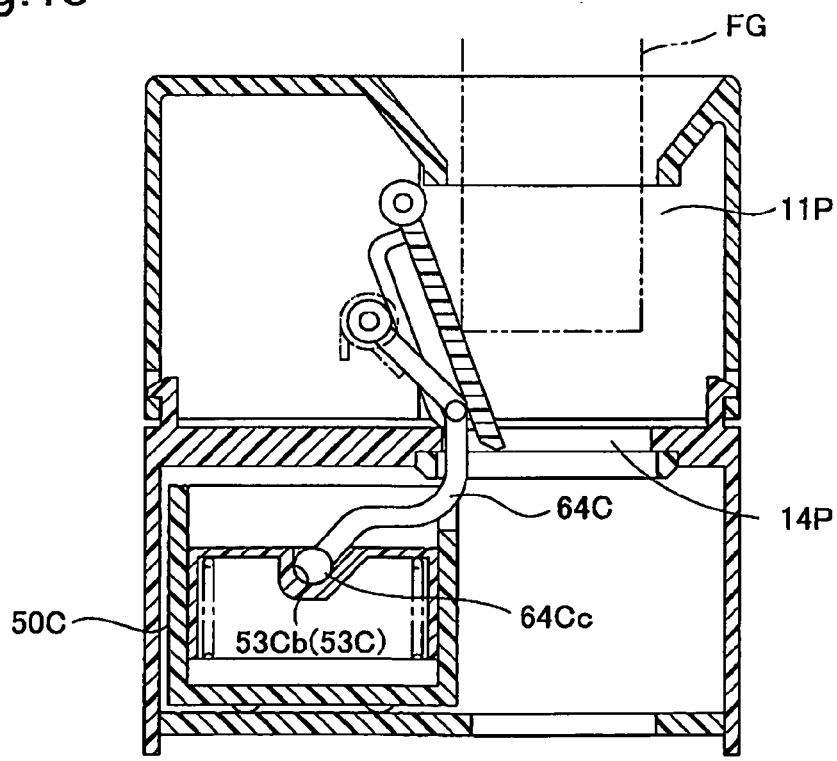
FIG. 13 is an explanatory drawing for explaining the operation following FIG. 12.

With the constitution of the opening-closing mechanism 30, as shown in FIG. 12, when the fueling gun FG is inserted from the opening 16Cf and the tip of the fueling gun FG presses the disk part 41Ca of the shutter mechanism 40C, the opening and closing member 41C receives rotation force with the rotation support part 41Cb as the center. This force presses the arm 64Cb of the operating member 64C downward. The operating member 64C is guided to the slide guide member 43C by the sliding body 64Cd part, and while the slide gap 43Cc is moving, rotates in the clockwise direction in resistance to the spring force of the spring 42C. Then, by the rotation of the operating member 64C, the pressing body 64Cc is inserted inside the pressed part 53C of the valve body 52C. Then, as shown in FIG. 13, when the fueling gun FG is inserted deep into the fuel path 11P, the pressing body 64Cc presses the pressing surface 53Cb of the pressed part 53C according to the rotation of the operating member 64C, the valve opening-closing mechanism 50C is retracted from the inlet 14P, and the inlet 14P is opened.

Figure 14:
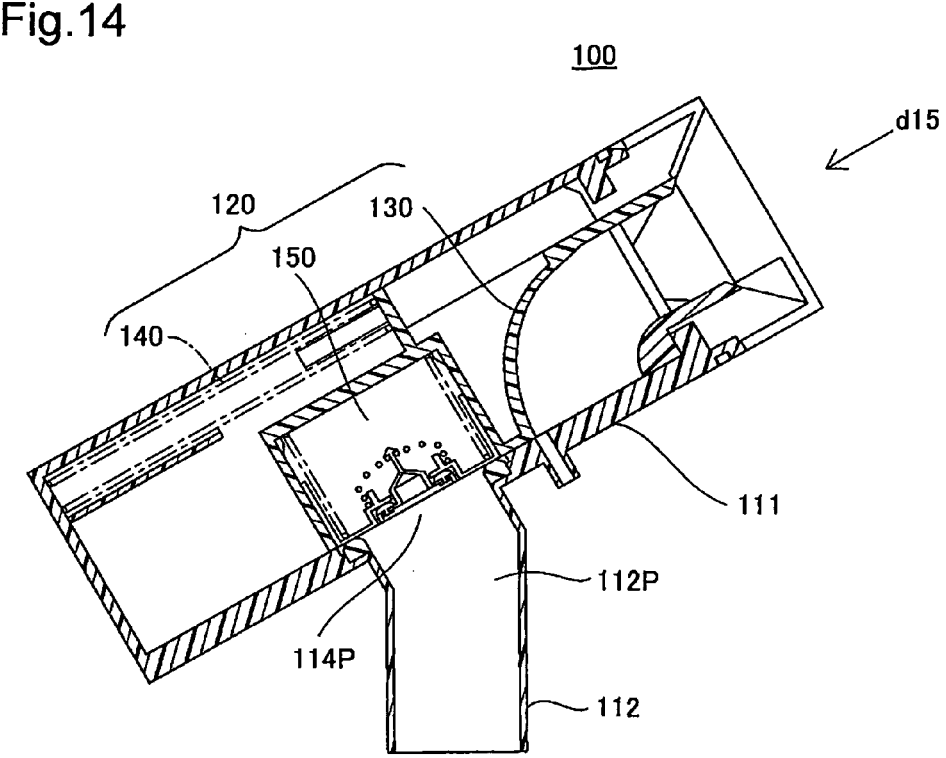
FIG. 14 is a cross section view showing the tank opening-closing device of the fourth embodiment.
Figure 15:
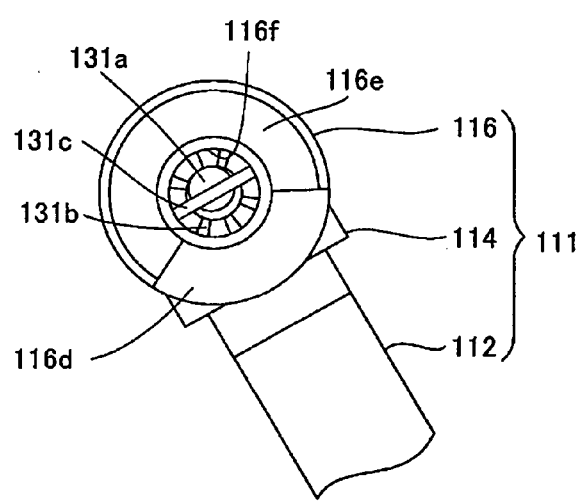
FIG. 15 is a drawing viewed from the arrow d15 direction of FIG. 14.

D. Fourth Embodiment (1) Schematic Constitution of the Tank Opening and Closing Device FIG. 14 is a cross section view showing the tank opening-closing device of the fourth embodiment. FIG. 15 is a drawing viewed from the arrow d15 direction of FIG. 14. The fourth embodiment has the characteristic of having a constitution for which the opening-closing mechanism moves as an integrated unit by the insertion of the fueling gun to open and close the inlet. Following, we will describe the detailed constitution of the tank opening-closing device.

(2) Constitution of Each Part

The tank opening-closing device 100 is equipped with the tank opening forming member 111 having the inlet 114P connected to the fuel tank (not illustrated), and the opening-closing mechanism 120 that opens and closes the inlet 114P.

(2)-1 Tank Aperture Forming Member 111

Figure 16:
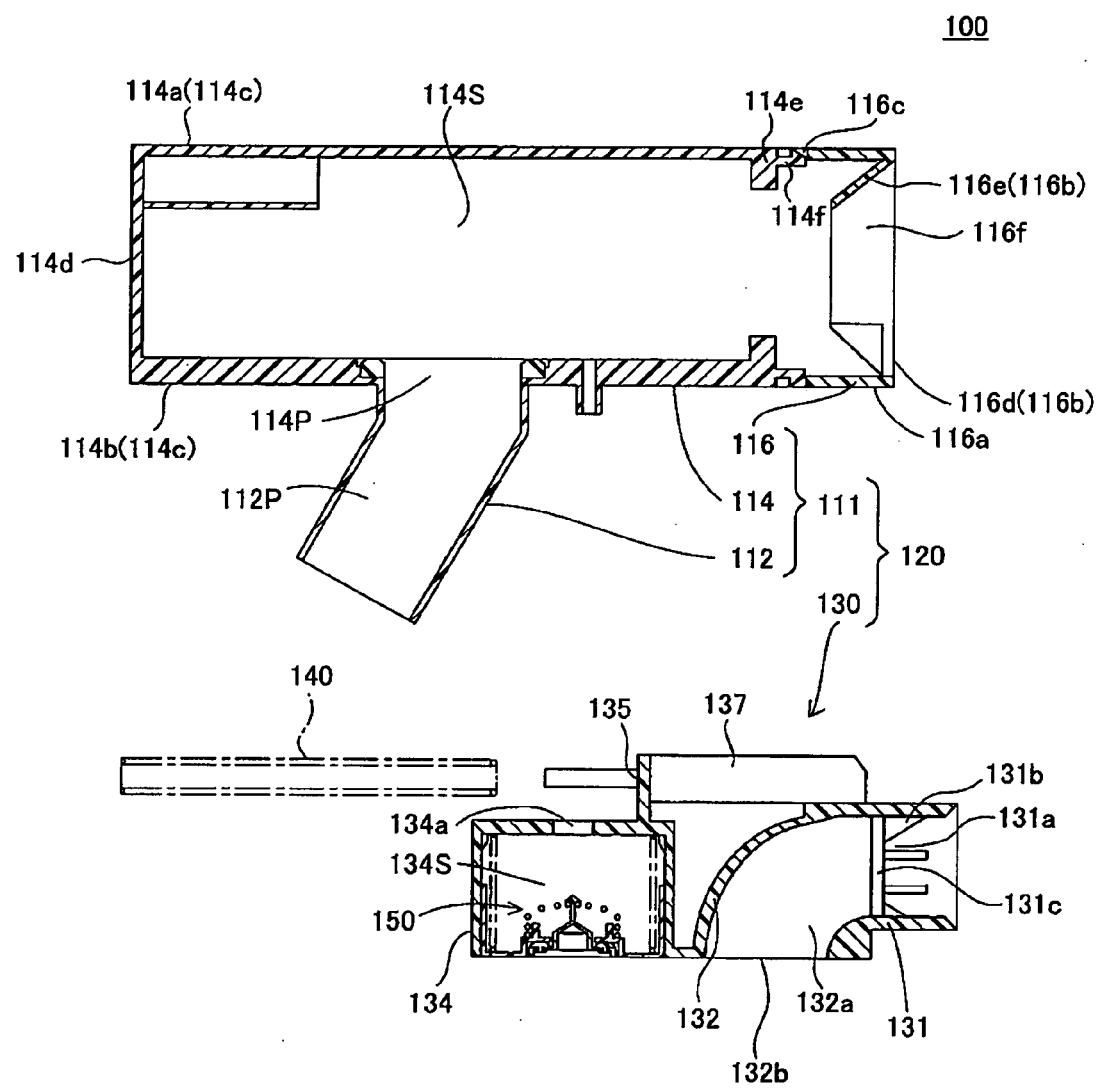
FIG. 16 is a cross section view showing an exploded view of the tank opening-closing device.

FIG. 16 is a cross section view showing an exploded view of the tank opening-closing device 100. The tank opening forming member 111 is a branched tube, and is equipped with a connection tube 112 connected to the fuel tank (not illustrated), a casing main unit 114 connected to the top edge part of the connecting tube 112, and the opening forming member 116 fixed to the top part of the casing main unit 114. The connecting tube 112 is equipped with the fuel path 112P, branches from the casing main unit 114, and is formed with a curve.

The casing main unit 114 has the side wall 114c constituted by a half cylinder shaped side wall 114a and a plate shaped wall part 114b, that side wall 114c is closed by the bottom wall 114d, and that internal space is the housing chamber 114S. Also, the inlet 114P is formed on the wall part 114b to connect the housing chamber 114S to the fuel path 112P. Also, a flange 114e is formed on the opening of the casing main unit 114.

The opening forming member 116 is mounted at one end part of the casing main unit 114, is equipped with a cylindrical side wall part 116a, and a top wall part 116b, and is mounted on the casing main unit 114 by engaging the engaging hook 114f formed on the top part of the casing main unit 114 to the engaging hole 116c on the bottom part. The top wall part 116b of the opening forming member 116 is constituted from the planar part 116d and the slanted surface 116e. As shown in FIG. 15, the slanted surface 116e is recessed in the center part across approximately a half circle, and is formed so as to be connected to the opening 116f.

(2)-2 Opening and Closing Mechanism 120

In FIG. 14, the opening-closing mechanism 120 is equipped with a moving casing 130, a spring 140 for biasing the moving casing 130, and the valve opening-closing mechanism 150, and during fueling, when the fueling lid is opened and pressing is done by the fueling gun or the like, the mechanism does fueling by opening the inlet 114P.

(2)-3 Constitution of the Moving Casing 130

In FIG. 16, the moving casing 130 is housed so as to be able to slide inside the housing chamber 114S, is equipped with a fuel introduction unit 131, a fuel path unit 132, a valve housing unit 134 constituting part of the valve opening-closing mechanism 150, a spring support unit 135, and a guide rib 137, and these are formed as an integrated unit. The fuel introduction unit 131 is equipped with an inflow part 131a connected to the opening 116f of the tank opening forming member 111, and is equipped with a guide unit 131b inclined toward the inflow port 131a and a bridge part 131c. The bridge part 131c is formed across the inflow port 131a, and is a site that receives the force pressed by the fueling gun (see FIG. 15). The fuel path unit 132 is connected to the inflow port 131a, and is equipped with an introduction path 132a bent at 90 degree, and an outflow port 132b connected to the introduction path 132a. The outflow port 132b is connected to the inlet 114P according to the position of the moving casing 130. The valve housing unit 134 is equipped with a valve chamber 134S which houses the valve opening-closing mechanism 150, and is connected to the atmosphere via the housing chamber 114S by the connection hole 134a. The spring support unit 135 supports one end of the spring 140. The spring 140 biases the moving casing 130 to the opening 116f side by being a bridge with the bottom wall 114d of the casing main unit 114. The guide rib 137 guides the moving casing 130 by sliding on the inner wall of the casing main unit 114.

(3) Constitution and Operation of the Valve Opening and Closing Mechanism 150

(3)-1 Constitution of the Valve Opening and Closing Mechanism 150

Figure 17:
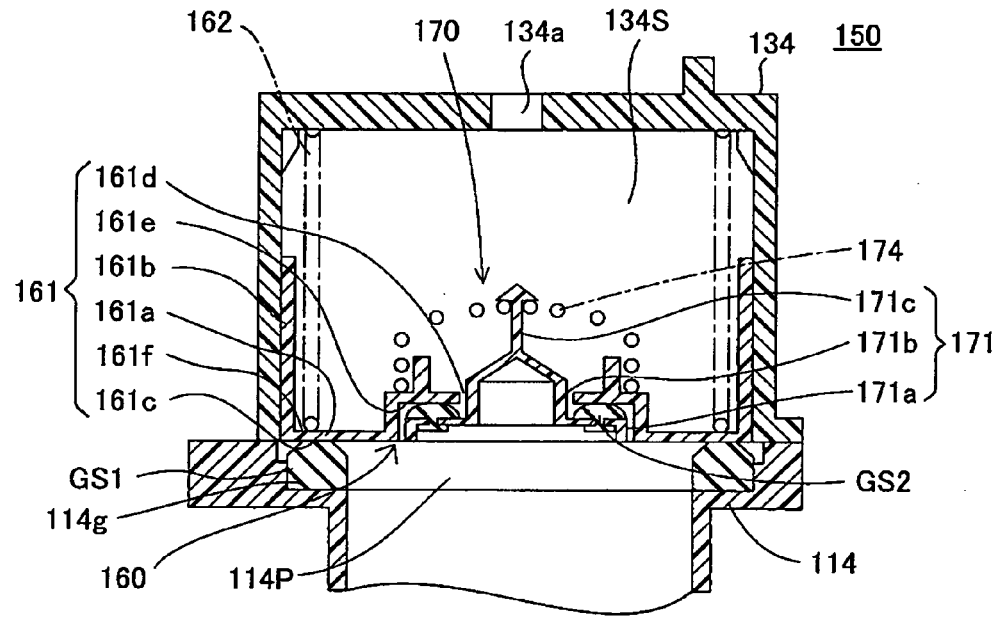
FIG. 17 is an expanded cross section view near the valve opening-closing mechanism.

FIG. 17 is an expanded cross section view near the valve opening-closing mechanism 150. The valve opening-closing mechanism 150 is constituted from the positive pressure valve 160 and the negative pressure valve 170 arranged inside the valve chamber 134S, the gasket GS1, and the valve housing unit 134 constituting part of the valve opening-closing mechanism 150, and adjusts the pressure inside the fuel tank to within a preset range. The gasket GS1 is a ring shaped member formed from a rubber material, and is press fit on the sealing holding unit 114g formed on the opening peripheral edge part of the inlet 114P of the casing main unit 114. Note that the valve opening-closing mechanism 150, together with the moving casing 130, constitutes the retraction mechanism for selectively moving the valve opening-closing mechanism 150 to the closing position and the fueling position in conjunction with the fueling gun.

The positive pressure valve 160 is equipped with a positive pressure valve body 161 that opens and closes the inlet 114P, and a first spring 162 for applying biasing force in the closing direction on the positive pressure valve body 161. The positive pressure valve body 161 is formed from resin, and is formed in a cup shape by the top wall 161a and the side wall part 161b which is provided projecting from the outer peripheral part of the top wall 161a. A sheet part 161c that contacts and separates with the gasket GS1 is formed on the top wall 161a of the positive pressure valve body 161, and by the sheet part 161c separating from the gasket GS1, a first valve flow path 160P (see FIG. 18) that is connected to the inlet 114P and the air is formed. Also, a through hole 161d is formed at the center part of the positive pressure valve body 161. This through hole 161d forms a second valve flow path 170P (see FIG. 19) connected to the inlet 114P. Furthermore, a seating unit 161e is formed at a site facing the second valve flow path 170P which is the bottom surface of the positive pressure valve body 161. The seating part 161e is an item that acts as the seating surface of the negative pressure valve 170 as described later. The spring support unit 161f is formed on the back surface side of the positive pressure valve body 161, and the spring support unit 161f supports one end part of the first spring 162. The first spring 162 bridges between the spring support unit 161f and the valve housing unit 134 by supporting the other end part at the inner wall of the valve housing unit 134.

The negative pressure valve 170 is equipped with the negative pressure valve body 171 made from resin, the gasket GS2, and the second spring 174 biasing toward the negative pressure valve body 171, bridging between the negative pressure valve body 171 and the positive pressure valve body 161. The negative pressure valve body 171 is equipped with a top wall plate part 171a, a tube shaped sliding unit 171b provided projecting from the inner peripheral part of the top wall plate part 171a, and the spring support unit 171c provided projecting from the tip of the sliding unit 171b, and these are formed as an integrated unit. The gasket GS2 is mounted on the top wall plate unit 171a of the negative pressure valve body 171, and the second valve flow path 170P is closed by this being seated on the seating part 161e of the positive pressure valve body 161. The second spring 174 is a peg spring that bridges between the back surface of the positive pressure valve body 161 and the spring support unit 171c, and biases the negative pressure valve body 171 in the closed valve direction.

(3)-2 Operation of the Valve Opening and Closing Mechanism 150

Figure 18:
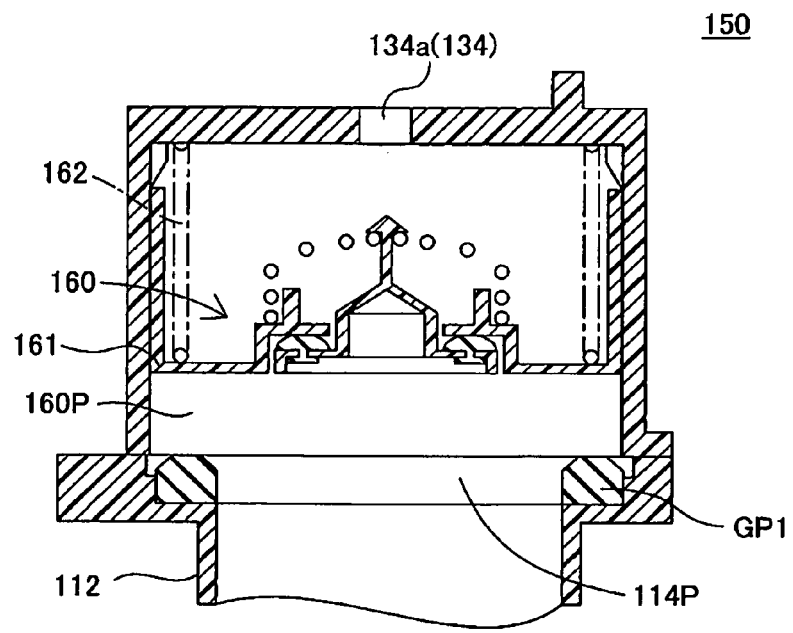
FIG. 18 is an explanatory drawing for explaining the operation of the valve opening-closing mechanism.

With the constitution of the valve opening-closing mechanism 150, the pressure adjustment inside the fuel tank by the positive pressure valve 160 is performed using the following operation. Specifically, at the closed valve position of the opening-closing mechanism 120 shown in FIG. 17, when the pressure inside the fuel tank becomes a positive pressure exceeding the first pressure value, as shown in FIG. 18, the positive pressure valve body 161 rises in resistance to the biasing force of the first spring 162, the fuel tank interior is connected to the outside air through the connecting tube 112, the inlet 114P, the first valve flow path 160P, the gap of the outer periphery of the positive pressure valve body 161, the connection hole 134a of the valve housing unit 134 and the like, and the positive pressure state inside the fuel tank moves toward being eliminated. By connecting to the outside air, when the differential pressure applied to the positive pressure valve body 161 goes below the biasing force of the first spring 162, the valve closes by the positive pressure valve body 161 being lowered by the biasing force of the first spring 162. In this way, the positive pressure valve body 161 opens and closes so that the pressure inside the fuel tank does not exceed the first pressure value.

Figure 19:
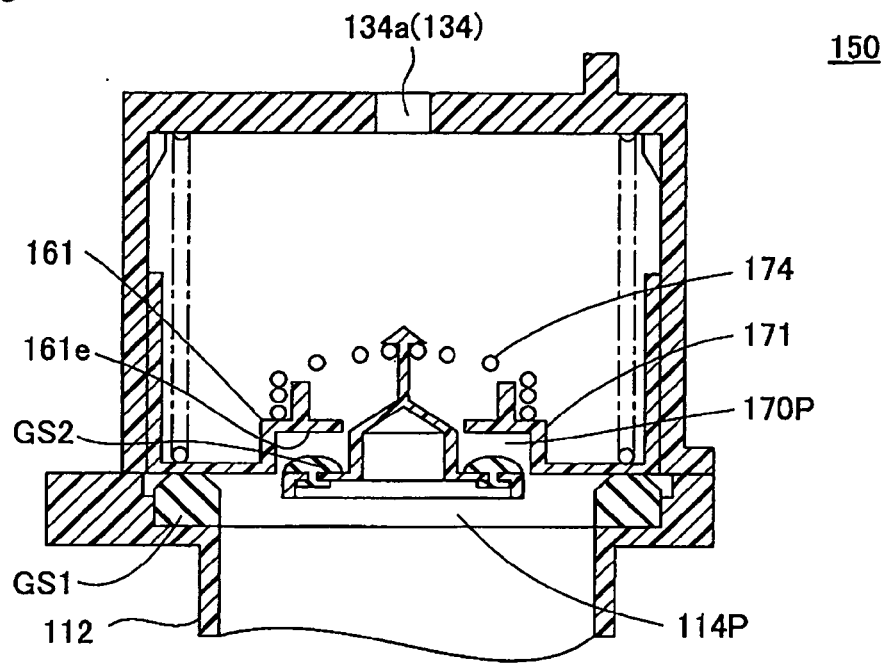
FIG. 19 is an explanatory drawing for explaining the operation of the valve opening-closing mechanism.

Meanwhile, as shown in FIG. 19, when the fuel tank interior goes to negative pressure below the second pressure value, the negative pressure valve body 171 moves downward in resistance to the biasing force of the second spring 174, and the gasket GS2 of the negative pressure valve body 171 is separated from the seating unit 161e of the positive pressure valve body 161. At this time, the positive pressure valve body 161 is seated on the gasket GS1, and to maintain that state, a second valve flow path 170P is formed between the negative pressure valve body 171 and positive pressure valve body 161. By doing this, the inlet 114P connects the fuel tank to the atmosphere through the second valve flow path 170P and the connection hole 134a, and the negative pressure state inside the fuel tank moves toward being eliminated. Then, when the differential pressure applied to the negative pressure valve body 171 goes below the biasing force of the second spring 174, the negative pressure valve body 171 is closed.

(4) Constitution and Operation of the Valve Separation Mechanism 180

Figure 20:
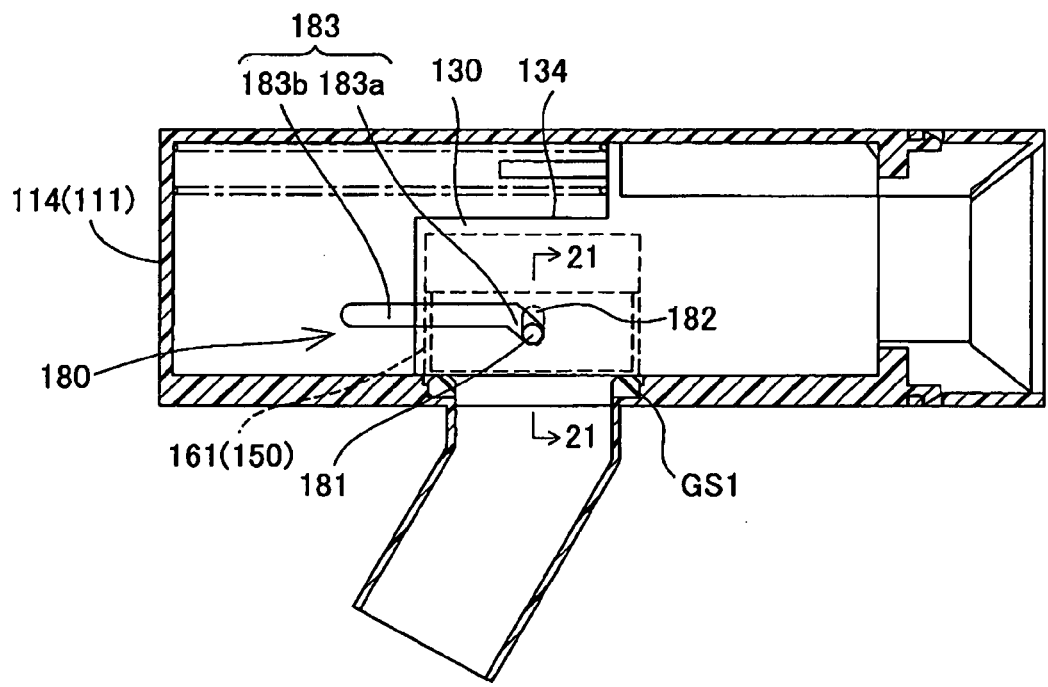
FIG. 20 is an explanatory drawing for explaining the valve separation mechanism.
Figure 21:
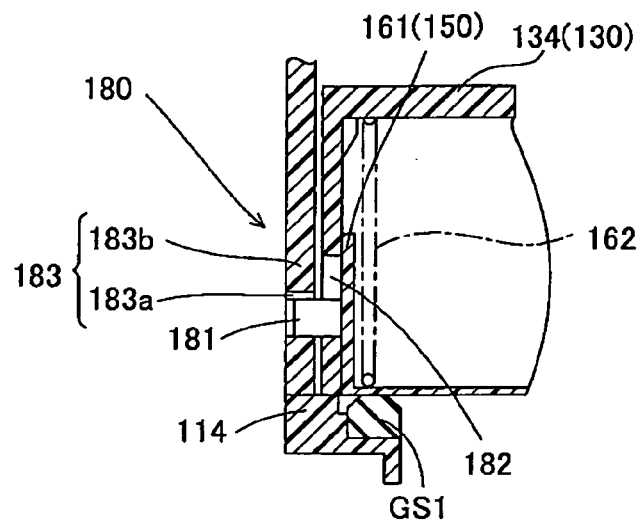
FIG. 21 is a cross section view along line 21-21 of FIG. 20.
Figure 22:
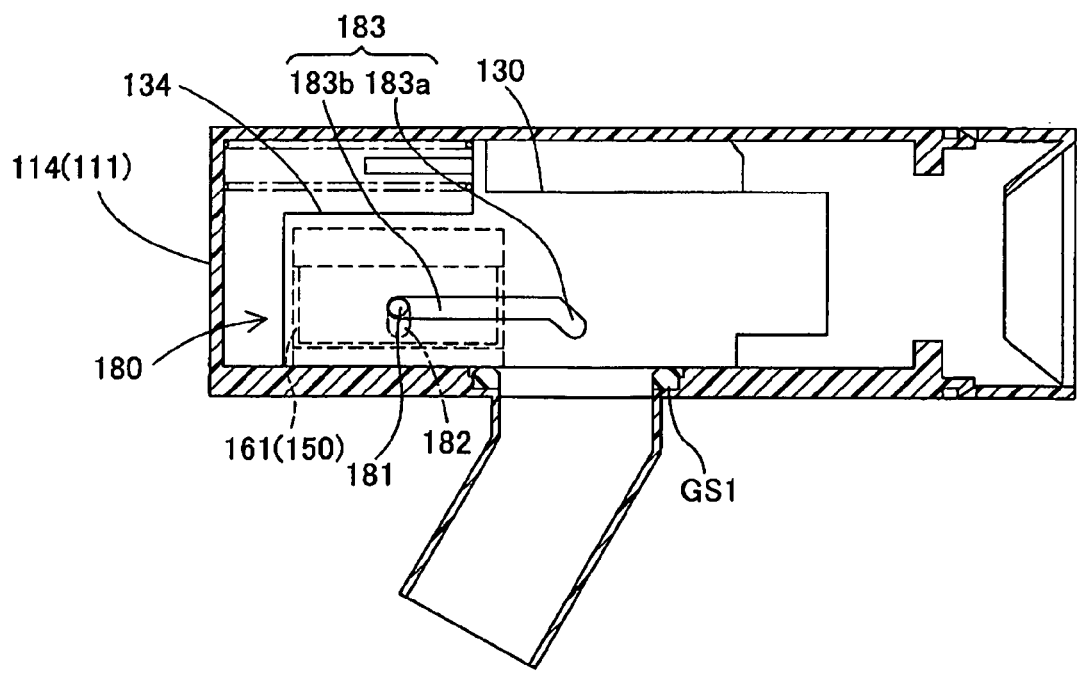
FIG. 22 is an explanatory drawing for explaining the operation of the valve separation mechanism.

FIG. 20 is an explanatory drawing for explaining the valve separation mechanism 180. The valve separation mechanism 180 is a mechanism for retracting the valve opening-closing mechanism 150 from the gasket GS1 according to the sliding operation of the moving casing 130, and is formed across the positive pressure valve body 161, the valve housing unit 134, and the casing main unit 114. FIG. 21 is a cross section view along line 17-17 of FIG. 20. A rod shaped coupling part 181 is provided projecting on the outer periphery part of the positive pressure valve body 161, an elongate hole 182 penetrated by the coupling unit 181 is formed on the valve housing unit 134, and the guide groove 183 is formed on the inner wall of the casing main unit 114. The guide groove 183 is equipped with an inclined groove 183a formed inclined in the radial direction, and a straight groove 183b formed along the sliding direction of the moving casing 130. With the constitution of the valve separation mechanism 180, when the moving cashing 130 slides to the left side of the illustration, as shown in FIG. 22, the coupling unit 181 follows the straight groove 183b from the inclined groove 183a of the guide groove 183. At this time, the positive pressure valve body 161 moves in the direction separating from the gasket GS1, specifically, in the axial direction of the gasket GS1.

(5) Opening and Closing Operation of the Tank Opening and Closing Device

Next, we will describe the opening and closing operation of the tank opening-closing device 100.

(5)-1 Opening Operation

Figure 23:
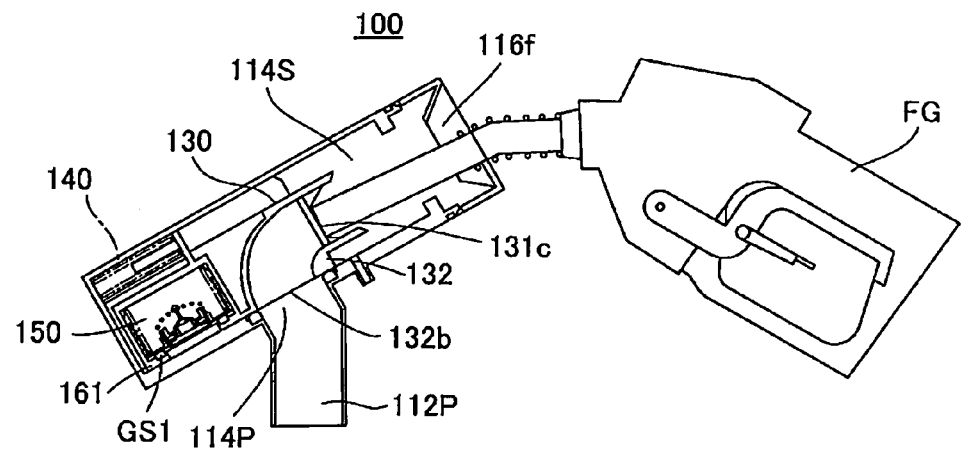
FIG. 23 is an explanatory drawing for explaining the fueling operation of the tank opening-closing device.

As shown in FIG. 14, when the tank opening-closing device 100 is in a closed state, when the fueling lid is opened and the fueling gun FG is inserted in the opening 116f of the tank opening-closing device 100 and the bridge part 131c of the moving casing 130 shown in FIG. 15 is pressed, as shown in FIG. 23, the moving casing 130 slides to the leftward direction in the drawing in resistance to the spring force of the spring 140 within the housing chamber 114S. By doing this, the valve opening-closing mechanism 150 is removed from the inlet 114P, and the outflow port 132b of the fuel path unit 132 is connected to the inlet 114P.

At this time, as shown in FIG. 20, when the valve opening-closing mechanism 150 slides, by the action of the valve separation mechanism 180, the coupling part 181 of the positive pressure valve body 161 follows the straight groove 183b from the inclined groove 183a of the guide groove 183 via the elongate hole 182, and it moves in the direction separating from the inlet 114P. By doing this, as shown in FIG. 22, the positive pressure valve body 161 that is an integrated unit with the coupling unit 181 also moves in the direction separating from the gasket GS1.

In this way, by retracting the valve opening-closing mechanism 150 as an integrated unit with the moving casing 130 in relation to the inlet 114P, the inlet 114P opens, and fueling is done from the fueling gun FG to the inlet 114P and the fuel path 112P. In this way, if the moving casing 130 is pressed by the fueling gun FG, the valve opening-closing mechanism 150 opens the inlet 114P, so it is possible to do fueling.

(5)-2 Closing Operation

When fueling ends, and the fueling gun FG is removed from the opening 116f, the fueling gun FG releases the spring force of the spring 140 via the moving casing 130. Specifically, the moving casing 130 is moved by the spring force to the right side in the drawing within the housing chamber 114S. At this time, when the coupling unit 181 of the valve separation mechanism 180 enters the inclined groove 183a via the straight groove 183b of the guide groove 183, the positive pressure valve body is seated on the gasket GS1. By doing this, the positive pressure valve body 161 closes the inlet 114P.

(6) Action and Effect of the Tank Opening and Closing Device

The following actions and effects are exhibited by the tank opening-closing device 100 of the embodiment noted above.

(6)-1 The valve opening-closing mechanism 150 functions as an opening and closing valve that opens and closes during fueling, and also functions as a pressure adjustment valve that opens when the differential pressure of the internal pressure of the fuel tank and the outside air exceeds a preset level, so it is not necessary to provide a plurality of valves, and it is possible to reduce the number of parts such as springs and the like.

(6)-2 With the valve opening-closing mechanism 150, it is sufficient to use only the gasket GS as the means for sealing the inlet 114P of the tank aperture member 111, so it is possible to reduce the number of parts and to make the constitution simple. In fact, the positive pressure valve body 161 of the valve opening-closing mechanism 150 presses uniformly on the gasket GS1 using the first spring 162, so it has excellent sealing integrity.

(6)-3 The valve opening-closing mechanism 150 is not directly pressed by the fueling gun FG in order to do its opening operation, so even if an emphasis is not placed on mechanical strength and durability, it is sufficient to have a design that emphasizes sealing integrity, so design is easy.

(6)-4 To do fueling, when the fueling gun FG is inserted from the opening 116f and presses the moving casing 130, the valve opening-closing mechanism 150 opens the inlet 114P, so it is not necessary to have the fueling gun FG press the valve opening-closing mechanism 150 to open the inlet 114P, and the operability is excellent.

(6)-5 The inlet 114P is arranged in an approximately right angle direction to the movement direction of the moving casing 130, and in fact the introduction path 132a is bent at 90 degree so as to face opposite the inlet 114P from the movement direction, so when it is necessary to bend the routing path to the fuel tank, it is possible to simply realize the with the fuel path part 132 of the moving casing 130.

(6)-6 The valve separation mechanism 180 moves in the fueling gun insertion direction after the positive pressure valve body 161 is moved in the axial direction of the gasket GS1 by the coupling unit 181 of the positive pressure valve body 161 following the inclined groove 183a of the guide groove 183, so when the positive pressure valve body 161 is separated from the gasket GS1, there is no grinding with a large force in relation to the gasket GS, and the durability of the gasket GS1 is excellent.

E. Fifth Embodiment

Figure 24:
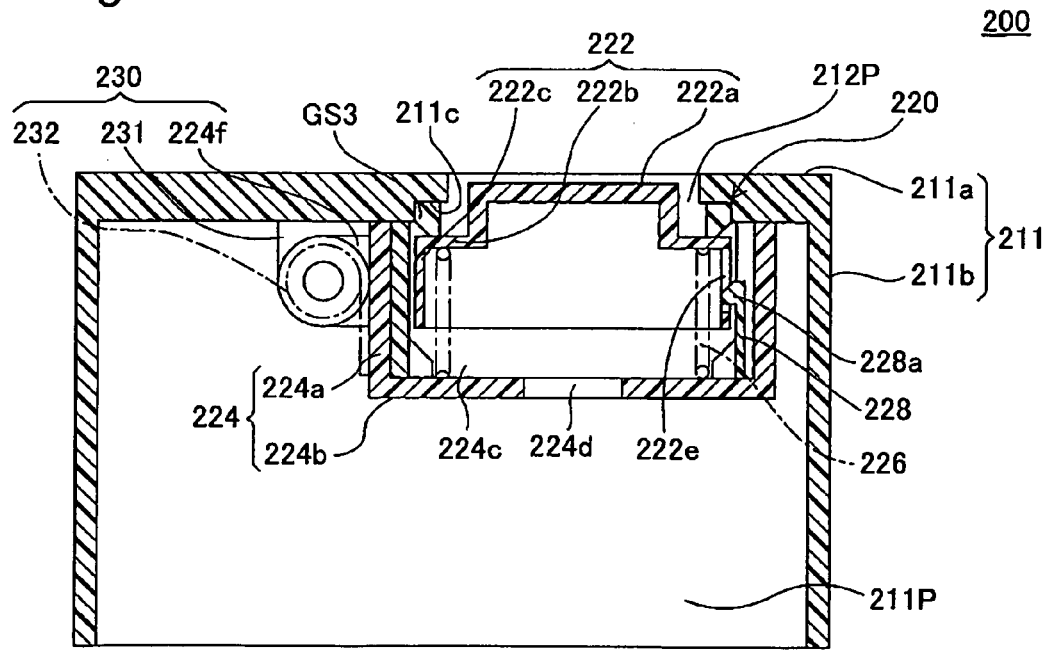
FIG. 24 is a cross section view showing the tank opening-closing device of the fifth embodiment.

FIG. 24 is a cross section view showing the tank opening-closing device 200 of the fifth embodiment. The tank opening-closing device 200 of the fifth embodiment has the characteristic of a constitution for which the valve opening-closing mechanism 220 is supported to be able to rotate on the tank opening forming member 211. Specifically, the tank opening forming member 211 is a pipe shape consisting of the upper wall 211a and the side wall 211b formed in a tube shape at the outer periphery part of the top wall 211a, and the inlet 212P is formed on the top wall 211a. The seal holding part 211c is formed on the opening peripheral edge part of the inlet 212P, and the gasket GS3 is held.

The valve opening-closing mechanism 220 is equipped with a valve support moving body 224, a spring 226, and a valve regulating body 228. The valve body 222 is equipped with a pressing unit 222a for being pressed by the fueling gun, a sealing unit 222b formed on the outer periphery of the pressing unit 222a, and a side wall part 222c provided extending in a cylindrical shape at the outer periphery part of the sealing unit 222b, and is formed in a downward cup shape. The valve support moving body 224 is equipped with a side wall 224a and a bottom wall 224b formed on the bottom part of the side wall 224a, and the internal space of this formed in an upward cup shape becomes the valve housing chamber 224c. A connection hole 224d is formed connected to the valve housing chamber 224c and the fuel path 211P on the bottom wall 224b. The spring 226 biases the in the closing direction of the valve body 222 supported on the bottom wall 224b. The valve regulating body 228 is housed in the valve housing chamber 224c, holds the valve body 222 so as to be able to slide, and is equipped with the engaging hook 228a. The engaging hook 228a keeps the valve body 222 from falling out by engaging with the notch 222e formed on the side wall unit 222c.

The retraction mechanism 230 is equipped with a rotation support part 224f formed on the outer wall of the bottom wall 224b, an axis support unit 231 formed on the inner wall of the tank opening forming member 211, and the spring 232 supported on the axis support unit 231. The valve opening-closing mechanism 220 is pivoted at the tank opening forming member 211 via the axis support unit 231 and the rotation support part 224f of the valve support moving body 224, and is biased in the direction of the inlet 212P by the spring 232.

Figure 25:
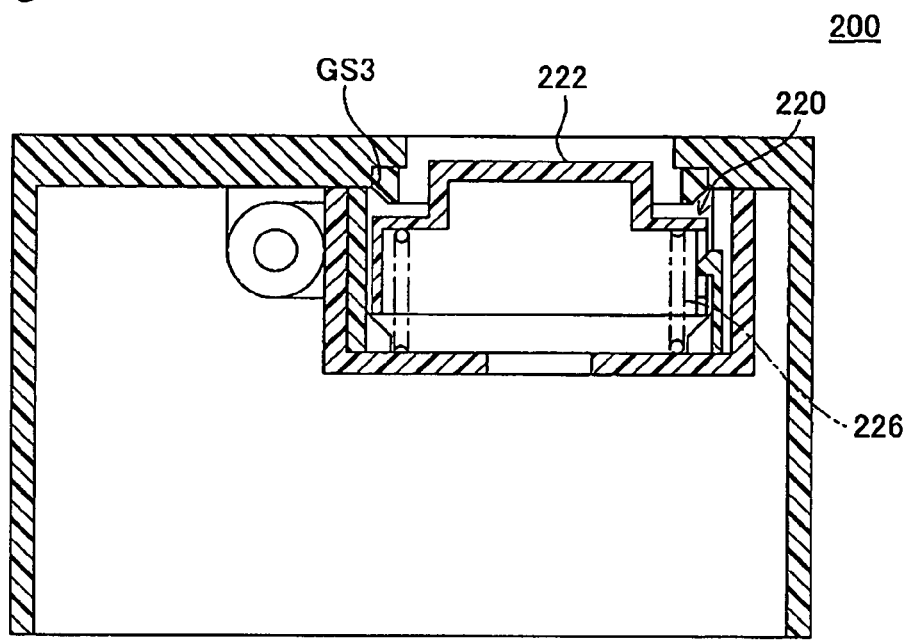
FIG. 25 is an explanatory drawing for explaining the operation of the valve opening-closing mechanism.

In the closed state of the valve opening-closing mechanism 220 of FIG. 24, with the relationship of the forces applied to the valve body 222 of the valve opening-closing mechanism 220, in other words, the relationship of the force in the opening direction by the atmospheric pressure and the force in the closing direction by the tank internal pressure and the spring force of the spring 226, when there is a negative pressure state for which the former exceeds the latter, as shown in FIG. 25, the valve body 222 moves downward in resistance to the biasing force of the spring 226, is separated from the gasket GS3, and a ventilation path is secured in that space between. The fuel tank is connected to the atmosphere through this ventilation path and the negative pressure state inside the fuel tank moves toward being eliminated. Then, when the differential pressure applied to the valve body 222 is lower than the biasing force of the spring 226, the valve body 222 is closed.

Figure 26:
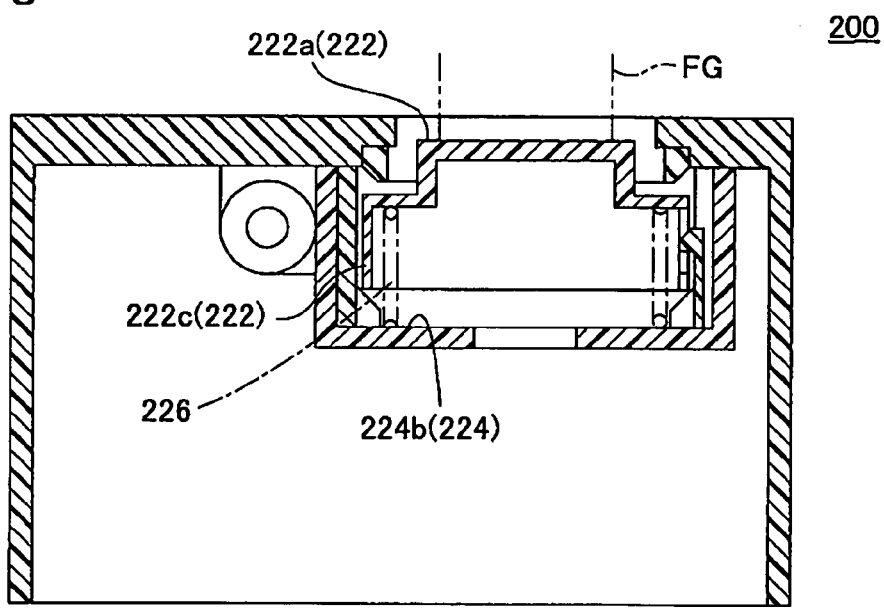
FIG. 26 is an explanatory drawing for explaining the opening and closing operation of the valve opening-closing mechanism.
Figure 27:
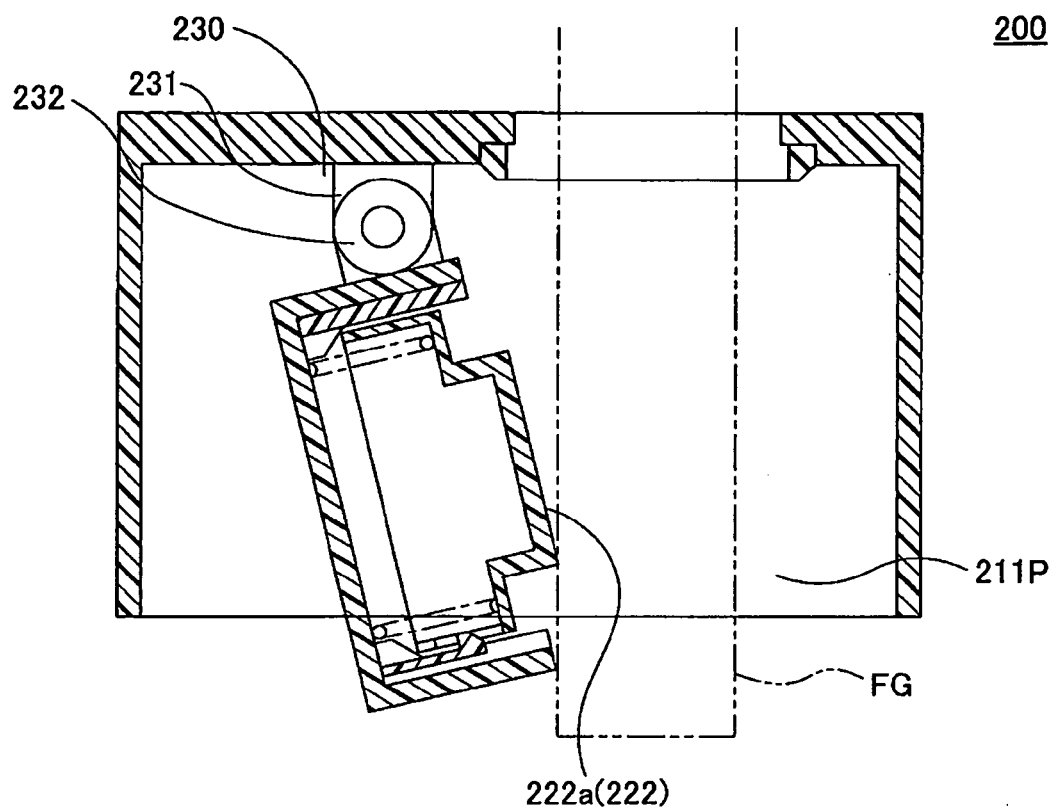
FIG. 27 is an explanatory drawing for explaining the operation following FIG. 26.

As shown in FIG. 26, when the pressing part 22a of the valve body 222 is pressed by the fueling gun FG, the valve body 222 is pressed down in resistance to the spring force of the spring 226, and when the bottom part of the side wall part 222c comes in contact with the bottom wall 224b of the valve support moving body 224, the movement of the valve body 222 is regulated. As shown in FIG. 27, when the pressing part 222a is further pressed by the fueling gun FG, it rotates in resistance to the spring force of the spring 232 with the axis support unit 231 of the retraction mechanism 230 as the center, the fueling gun FG is inserted in the fuel path 211P, and in this state, fueling is done from the fueling gun FG.

The tank opening-closing device 200 of the embodiment has the valve opening-closing mechanism 220 axially supported on the tank opening forming member 211 by the retraction mechanism 230, and it is possible to open the inlet 212P by direct pressing by the fueling gun FG, so a linking mechanism is not necessary, and the constitution is simple.

F. Sixth Embodiment

Figure 28:
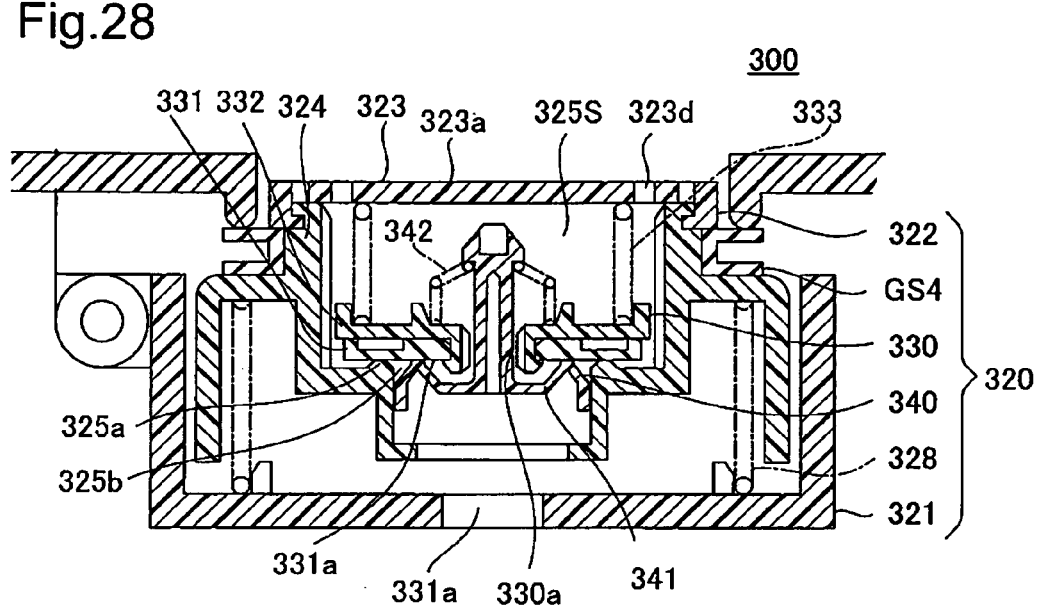
FIG. 28 is a cross section view showing the tank opening-closing device of the sixth embodiment.

FIG. 28 is a cross section view showing the tank opening-closing device 300 of the sixth embodiment. The tank opening-closing device 300 of the sixth embodiment has the characteristic constitution of having the pressure adjustment valve consisting of a positive pressure valve and a negative pressure valve and the gasket GS4 attached to the valve opening-closing mechanism 320. Specifically, the valve opening-closing mechanism 320 is equipped with the valve support moving body 321, the valve body 322, the spring 328, the gasket GS4, and the positive pressure valve 330 and the negative pressure valve 340 constituting the pressure adjustment valve. The valve body 322 is equipped with the pressing member 323 having a pressing part 323a for being pressed by the fueling gun FG, and the valve main unit 324 for holding the pressing member 323.

Figure 29:
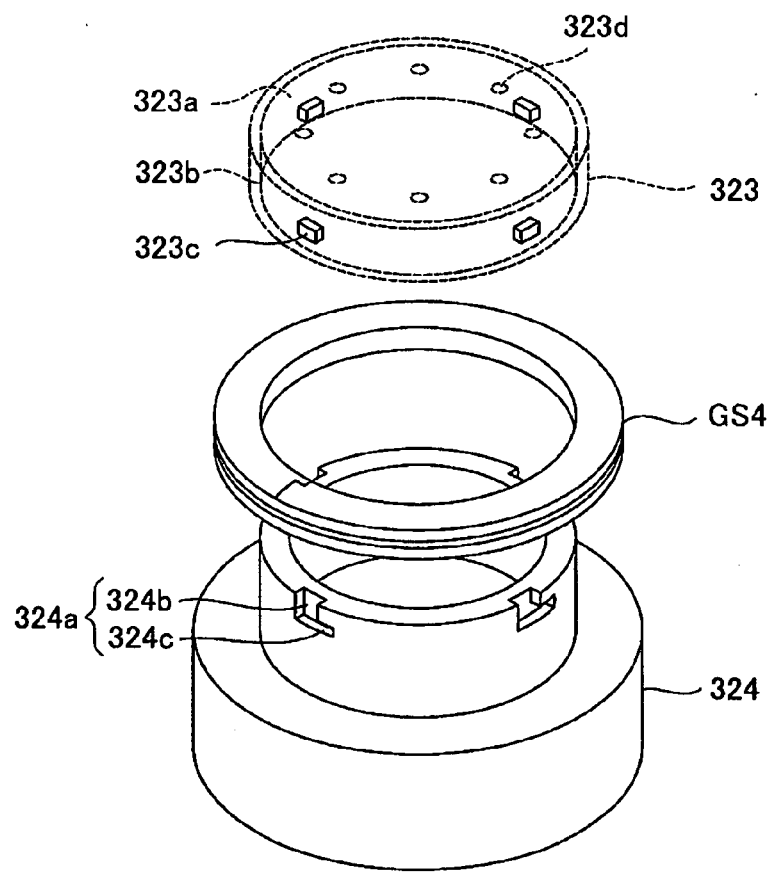
FIG. 29 is a perspective view showing the state with the pressing member removed from the valve main unit.

FIG. 29 is a perspective view showing the state with the pressing member 323 removed from the valve main unit 324. The pressing member 323 is equipped with a cylindrical mounting part 323 formed on the outer peripheral part of the pressing part 323a. The mounting part 323b is a site for mounting on the valve main unit 324, and latching projections 323c are formed in four locations on its inner wall. L shaped mounting grooves 324a are formed in four locations on the top part outer periphery of the valve main unit 324. With the pressing member 323, when the latching projection 323c is rotated after being positioned at the perpendicular part 324b of the mounting groove 324a and pressed in, by the latching projection 323c engaging with the horizontal part 324c of the mounting groove 324a, the pressing member 323 is mounted on the valve main unit 324. The ventilation hole 323d is formed on the pressing member 323, and the ventilation hole 321a is formed on the bottom part of the valve support moving body 321.

Figure 30:
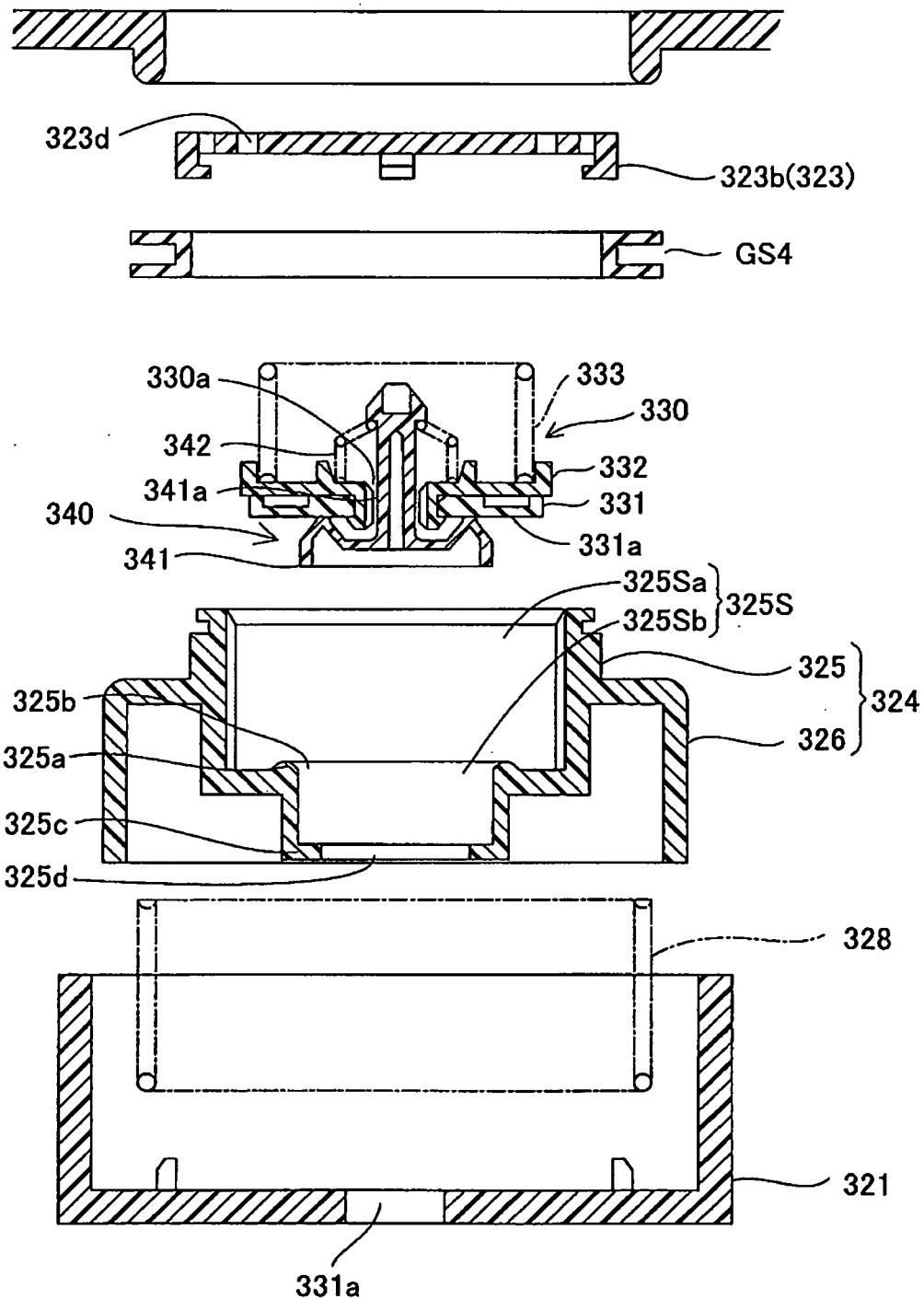
FIG. 30 is a cross section view showing an exploded view of the tank opening-closing device.

FIG. 30 is a cross section view showing an exploded view of the tank opening-closing device 300. The valve main unit 324 is equipped with the valve chamber forming body 325 that forms the valve chamber 325S, and the spring support unit 326 formed in a cylindrical shape on the outer peripheral part of the valve chamber forming body 325. The positive pressure valve 330 and the negative pressure valve 340 are housed in the valve chamber 325S of the valve chamber forming body 325. The spring support unit 326 supports the spring 328 with the bottom surface of the valve support moving body 321.

The gasket GS4 is held by being pressed by the spring support unit 326 and the pressing member 323. Specifically, the gasket GS4 is a cross section ⊐ shape, is mounted on the top part of the spring support unit 326, and by being pressed by the bottom part of the mounting unit 323b of the pressing member 323, is held on the valve main unit 324.

The positive pressure valve 330 and the negative pressure valve 340 are housed in the valve chamber 325S of the valve chamber forming body 325, and the tank internal pressure is adjusted to within a preset range by shutting off the connection of the path within the valve chamber 325S between the outside air and the fuel path. The positive pressure valve 330 is arranged in the upper chamber 325Sa of the valve chamber 325S, and the negative pressure valve 340 is arranged in the lower chamber 325Sb. The first seating unit 325a is formed on the inner periphery part which is between the upper chamber 325Sa and the lower chamber 325Sb and has a reduced diameter from the inside of the valve chamber forming body 325, and a valve flow path 325b is formed facing the first seating unit 325a. This valve flow path 325b is connected to the connection hole 325d formed on the bottom part 325c of the valve chamber forming body 325, and is further connected to the fuel path via the ventilation hole 321a from the connection hole 325d.

The positive pressure valve 330 is equipped with the positive pressure valve body 331 made of rubber that opens and closes the valve flow path 325b, the valve holding member 332, and the first spring 333 which is supported on the bottom surface of the pressing member 323 and which also applies biasing force in the closing direction on the positive pressure valve body 331 via the valve holding member 332. Also, the through hole 330a is formed at the center part of the positive pressure valve body 331 and the center part of the valve holding member 332, and outside air is lead to the negative pressure valve 340 via the through hole 330a.

The negative pressure valve 340 is equipped with the negative pressure valve body 341 made from resin, and the second spring 342 biasing toward the negative pressure valve body 341. The valve support rod 341a is provided projecting upward at the center part of the negative pressure valve body 341. The valve support rod 341a pierces the through hole 330a of the positive pressure valve body 331 and the valve holding member 332, and on its top edge, the second spring 342 is supported with the valve holding member 332.

In FIG. 28, the pressure adjustment within the fuel tank by the positive pressure valve 330 is performed by the following operation. When the pressure inside the fuel tank exceeds a preset positive pressure value, the positive pressure valve body 331 and the valve holding member 332 rise in resistance to the biasing force of the first spring 333, and through the valve flow path 325b of the valve chamber 325S or the like, the fuel tank interior connects with the outside air and moves toward the positive pressure state within the fuel tank being eliminated. Meanwhile, when the fuel tank interior becomes a negative pressure lower than a preset negative pressure value, the negative pressure valve body 341 moves downward in resistance to the biasing force of the second spring 342, and the negative pressure valve body 341 is separated from the second seating unit 331a of the positive pressure valve body 331. At this time, the positive pressure valve body 331 is seated on the first seating unit 325a, and to maintain that state, a path is formed between the negative pressure valve body 341 and the positive pressure valve body 331. By doing this, the fuel tank is connected to the atmosphere through the ventilation hole 323d of the pressing member 323, the through hole 330a of the valve holding member 332 and the like, and moves toward the negative pressure state within the fuel tank being eliminated.

Also, by the spring force of the spring 328 being set larger than the spring force of the first spring 333 that opens the positive pressure valve 330 and making the opening valve pressure big, it is possible to increase the fuel tank backup function.

G. Seventh Embodiment

Figure 31:
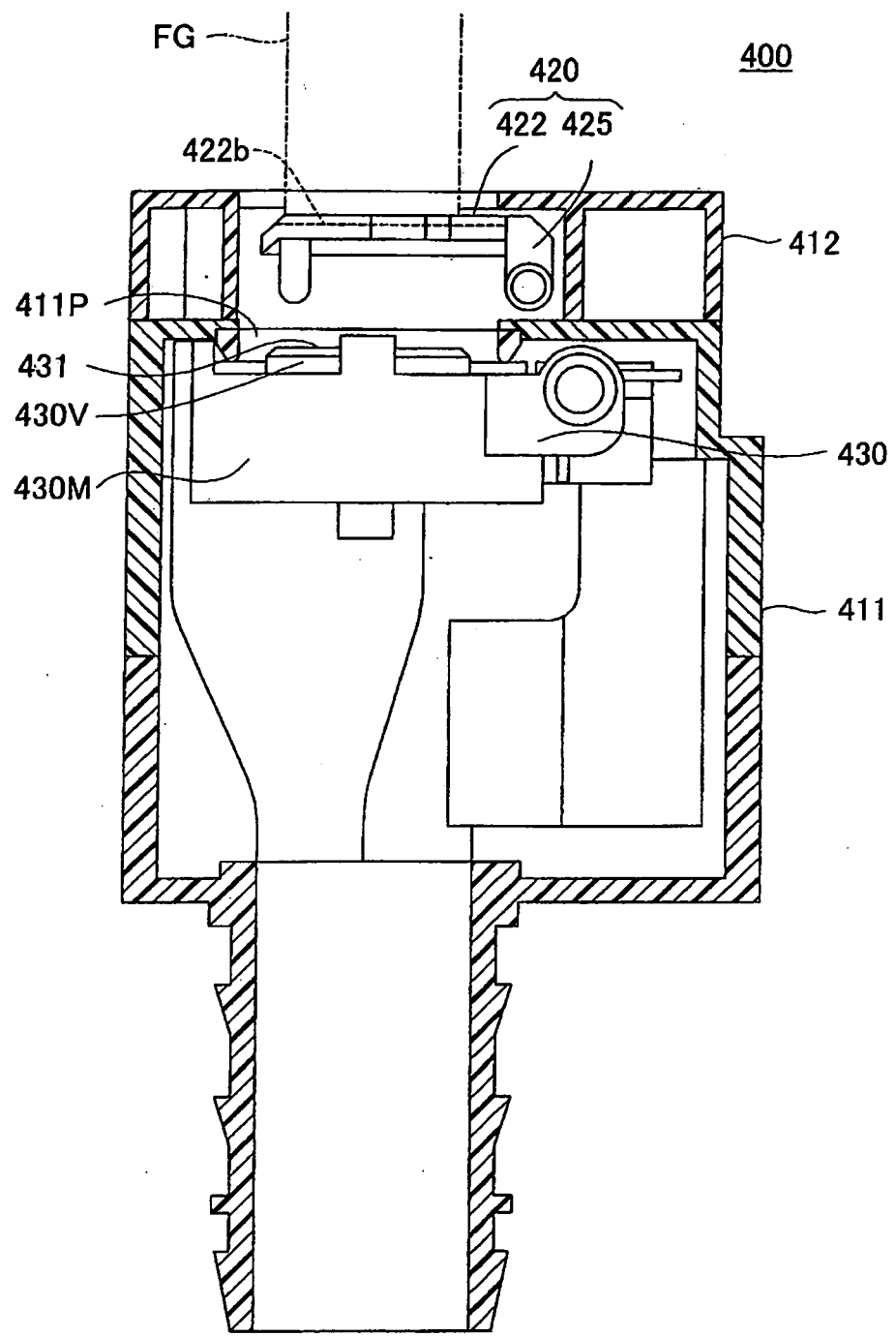
FIG. 31 is a cross section view showing the opening-closing mechanism of the seventh embodiment.

FIG. 31 is a cross section view showing the tank opening-closing device of the seventh embodiment. The tank opening-closing device of the embodiment is characterized by a constitution with a retraction mechanism housed inside the tank opening forming member. Specifically, the tank opening-closing device 400 is arranged on the upper side of the inlet 411P of the tank opening forming member 411, and is equipped with the valve opening-closing mechanism 430 having a valve body 430V and a valve support moving body 430M housing the valve body 430V which can apply the same kind of constitution as that of the fifth or sixth embodiment, and an opening-closing activation mechanism 420 constituting part of the retraction mechanism for doing the opening and closing operation of the valve opening-closing mechanism 430. The opening-closing activation mechanism 420 is equipped with the operating member 422, the axis support unit 425 provided at one end of the operating member 422, and a spring (not illustrated) biasing in the closing direction of the operating member 422. The axis support unit 425 has the operating member 422 supported to be able to rotate on the support body 412 of the tank opening forming member 411.

Figure 32:
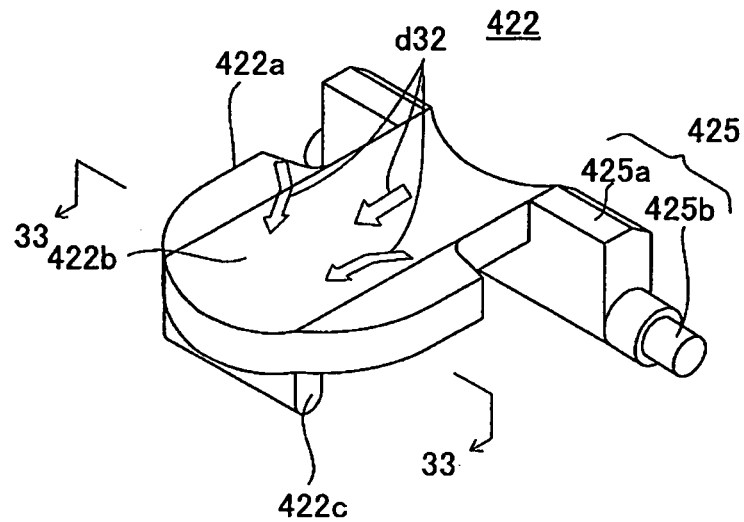
FIG. 32 is a perspective view showing the operating member.
Figure 33:
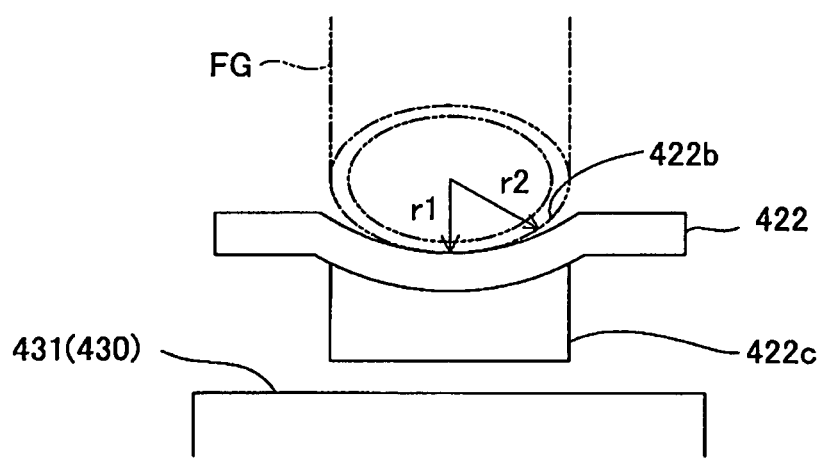
FIG. 33 is a cross section view along line 33-33 of FIG. 32.

FIG. 32 is a perspective view showing the operating member 422. FIG. 33 is a cross section view along line 33-33 of FIG. 32. The operating member 422 is equipped with a plate shaped operating member main unit 422a for which one end is an arc, a guide recess 422b formed on the top surface of the operating member main unit 422a, and a pressing part 422c provided projecting from the bottom part of the operating member main unit 422a. As shown in FIG. 33, the guide recess 422b is a curved surface that is pressed by the fueling gun FG and also guides the fueling gun FG in the direction of the arrow d32 (FIG. 32), and by forming its curvature r1 larger than the radius r2 of the fueling gun FG, it is formed so as to be able to move the fueling gun FG smoothly to a position at which pressing is possible. The pressing part 422c is a projection for pressing the pressed part 431 (see FIG. 31) of the valve opening-closing mechanism 430, and its bottom edge is a curved surface for reducing the sliding resistance with the pressed part 431. Also, the operating member 422 uses a resin material that is softer than the pressed part 431 to avoid an increase in the friction resistance by preventing damage to the pressed part 431. For example, it is possible to have the operating member 422 be nylon and to use polyacetal for the pressed part 431. Returning to FIG. 32, the axis support unit 425 is equipped with a support base 425a provided extending to both sides of the axial direction from the other end of the operating member main unit 422a, and an axis 425b provided projecting from the support base 425a.

Figure 34:
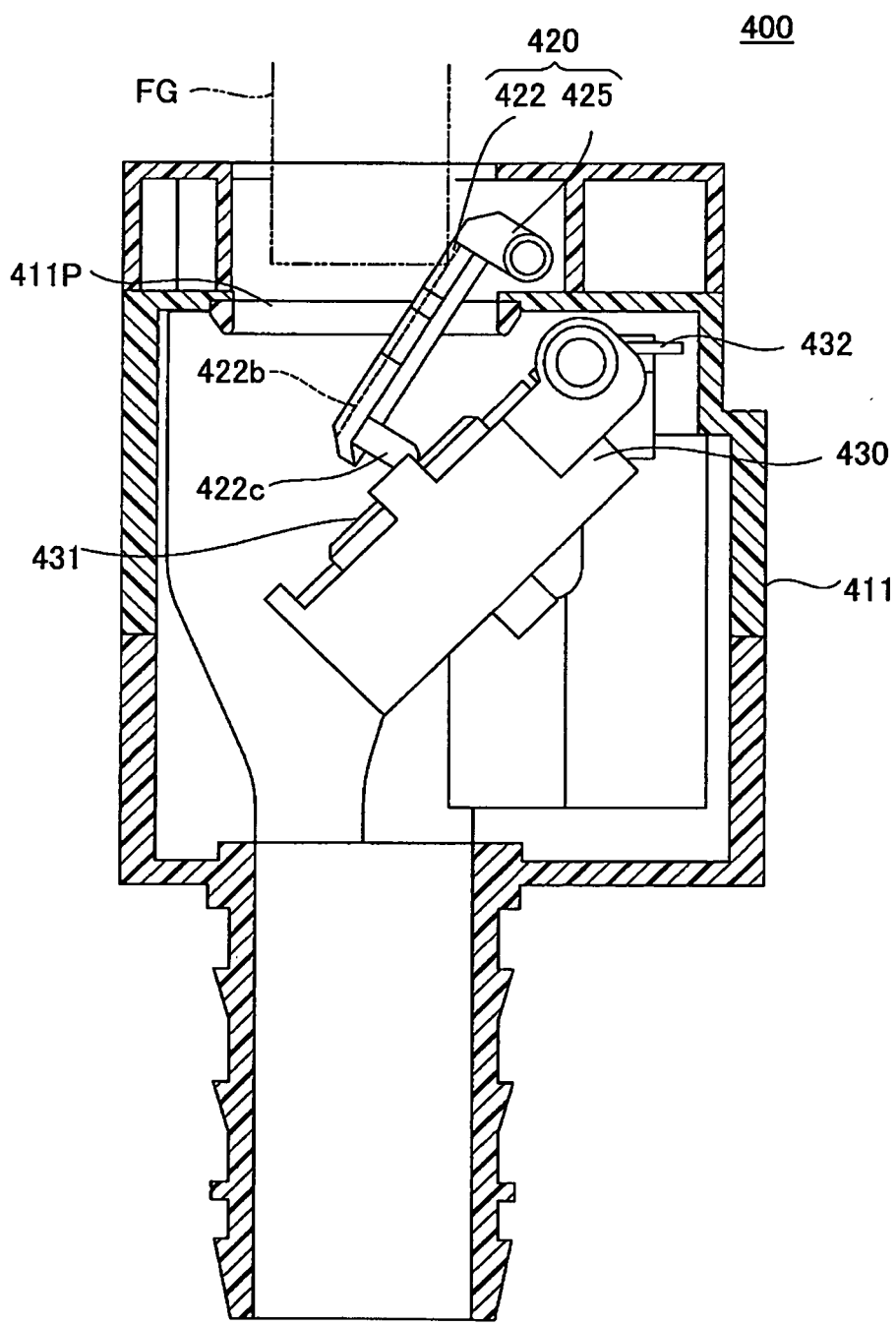
FIG. 34 is an explanatory drawing for explaining the operation of the tank opening-closing device.
Figure 35:
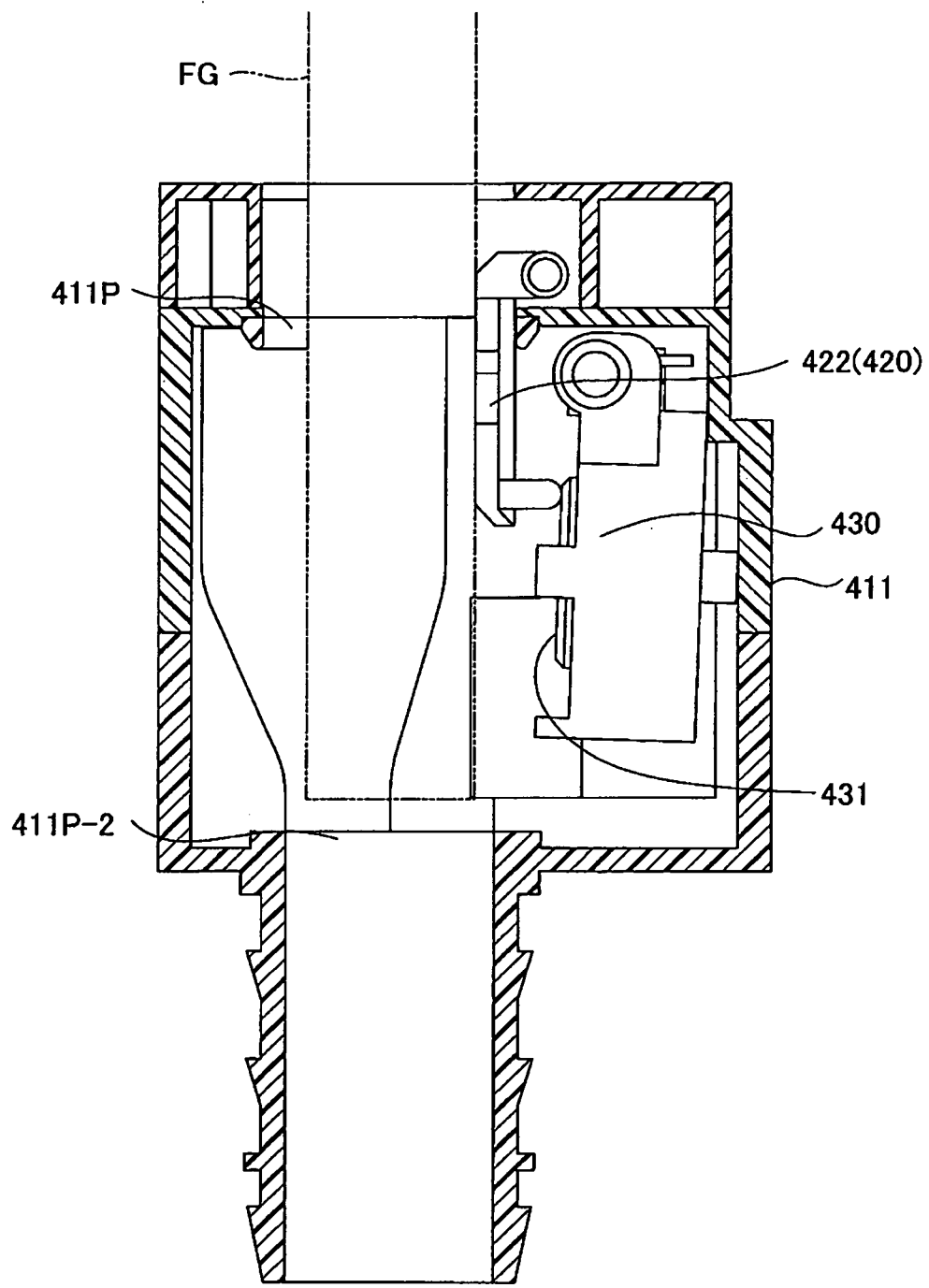
FIG. 35 is an explanatory drawing for explaining the operation following FIG. 34.

With this constitution, as shown in FIG. 31, when the fueling gun FG is inserted from the upper side of the inlet 411P, the tip of the fueling gun FG presses the guide recess 422b of the operating member 422. By doing this, as shown in FIG. 34, the operating member 422 rotates in the opening direction, and the pressing part 422c of the bottom part of the operating member 422 presses the pressed part 431 of the valve opening-closing mechanism 430. Since the bottom edge of the pressing part 422c is a curved surface, the valve opening-closing mechanism 430 is opened and operated while the flat surface of the pressed part 431 slides. Furthermore, as shown in FIG. 35, when the fueling gun FG is inserted, the operating member 422 and the valve opening-closing mechanism 430 is rotated by approximately 90 degree to open the inlet 411P, and fueling is performed by inserting the fueling gun FG in the fuel path port 411P-2. Then, when fueling ends and the fueling gun FG is removed, the force applied to the operating member 422 is cancelled, so this returns to the state shown in FIG. 31 by the spring force of the spring 432 in the closing direction of the valve opening-closing mechanism 430.

With the embodiment, the force in the insertion direction of the fueling gun FG is not applied directly to the valve opening-closing mechanism 430, and is received via the operating member 422 of the opening-closing activation mechanism 420, so it is possible to maintain high sealing integrity without applying a large force biased toward the valve opening-closing mechanism 430 having a seal unit.

Also, with the opening-closing activation mechanism 420, the same as with embodiment 2, the shutter mechanism is omitted, and the constitution is made simple by doing direct operation of the operating member 422 using the fueling gun FG.

The opening-closing activation mechanism 420 transmits the insertion force of the fueling gun FG to the valve opening-closing mechanism 430 while the guide recess 422b of the operating member 422 slides the tip of the fueling gun FG and while the pressing part 422c of the operating member 422 slides in relation to the pressed part 431 of the valve opening-closing mechanism 430, so it is possible to smoothly do the opening and closing operation of the opening-closing activation mechanism 430.

Also, the operating member 422 of the opening-closing activation mechanism 420 has a constitution separated from the pressed part 431 of the valve opening-closing mechanism 430 with the pressing part 422c having the valve opening-closing mechanism 430 in a closed state by the biasing force of the spring, and since external force due to a vehicle collision is not exerted on the valve opening-closing mechanism 430, there is no bringing of a decrease in the sealing integrity of the valve opening-closing mechanism 430, and by putting the operating member 422 in contact with the wall surface of the tank opening forming member 411 by the biasing force of the spring, it is possible to prevent the rattling that comes with vehicle vibration.

Furthermore, the operating member 422 has the support base 425a and the pressing part 422c provided projecting to form a ⊐ shape downward from both ends of the operating member main unit 422a, in other words, the support base 425a extends in the axial direction upward, so interference does not occur easily on the gasket GS4, and it is possible to increase the rotation transmission range of the valve opening-closing mechanism 430. Also, the pressing part 422c presses a location separate from the axis 425b of the valve opening-closing mechanism 430, so operability is good.

Note that the operating member 422 of the opening-closing activation mechanism 420 does not have to have a constitution with biasing in the closing direction by a spring, and can also be handled with an engaging method or the like so as to prevent rattling that comes with vehicle vibration.

Also, with the seventh embodiment, as means for opening and closing the inlet, an opening-closing activation mechanism equipped with a pressure adjustment valve was used, but the invention is not limited to this, and it is also possible to use a flap valve with no valve body.

Note that this invention is not limited to the embodiments noted above, and it is possible to implement various modes in a scope that does not stray from the key points, for example the following variations are possible.

With the embodiments noted above, the opening and closing operation was done by the pressing operation of the fueling gun, but the invention is not limited to this, and it is also possible to use a constitution that does the pressing operation using a pressing button done manually by the user.

Also, with the embodiments noted above, a constitution was shown for which the gasket is mounted on the opening peripheral edge part of the inlet, but the invention is not limited to this, and it is also possible to use a constitution of mounting on a valve body, and to use a constitution and arrangement that seals between the valve body and the inlet opening peripheral edge part by being pressed by these items.

INDUSTRIAL APPLICABILITY

This invention can be used for a tank opening-closing device for fueling the fuel tank of a vehicle.

The invention claimed is:

1. A tank opening-closing device for opening and closing a fueling inlet for supplying fuel to a fuel tank, comprising:
   a tank opening forming member having the fueling inlet, and a fuel path configured to receive a fuel gun and supply the fuel supplied from a fueling gun to the fuel tank through the fueling inlet,
   a valve opening-closing mechanism including a valve body, a valve support moving body, and a spring biasing the valve body toward the closed position of the fueling inlet, the valve body being configured to open and close the fueling inlet and to regulate an internal pressure of the fuel tank,
   the valve support moving body including a side wall and a bottom wall formed on a bottom part of the side wall, the side wall and the bottom wall of the valve support moving body forming a cup-shaped valve housing chamber, the cup-shaped valve housing chamber housing the valve body, the valve body moving upwardly and downwardly within the cup-shaped valve housing chamber between a venting position providing a ventilation path in the fueling inlet and the closed position of the fueling inlet, and
   the spring of the valve opening-closing mechanism being supported on the bottom wall of the cup-shaped valve housing chamber of the valve support moving body, a biasing force of the spring pushing upwardly against the valve body and forcing the valve body in a direction closing the fueling inlet,
   a gasket interposed between the valve body and an opening peripheral edge part of the fueling inlet and pressing against the opening peripheral edge part of the fueling inlet and the valve body, and
   a retraction mechanism connected to the valve-opening closing mechanism and pivoting the valve-opening closing mechanism about a horizontal axis relative to an axis of the fueling inlet, the retraction mechanism working in conjunction with the fueling gun or an external force to pivot the valve-opening closing mechanism about the horizontal axis and between the fueling position and the closed position, wherein
   in the closed position, the valve body moves toward the venting position when atmospheric pressure exceeds the internal pressure of the fuel tank and the biasing force of the spring and provides the ventilation path in the fueling inlet for regulating internal pressure of the fuel tank, and
   in the fueling position, the valve body pivots away from the fueling inlet and enables fuel supply.

2. The tank opening-closing device according to claim 1, wherein
   the valve opening-closing mechanism is pivoted at the tank opening forming member so as to open and close the fueling inlet, and
   the retraction mechanism comprises an opening-closing activation mechanism having an operating member which is arranged at a side for which the fueling gun is inserted against the fueling inlet, is rotated by being pressed by the fueling gun, and opens and operates the valve opening-closing mechanism.

3. The tank opening-closing device according to claim 2, wherein the operating member has a guide recess for which rotation force is applied to the operating member pressed by a tip of the fueling gun.

4. The tank opening-closing device according to claim 3, wherein the guide recess is formed with a radius larger than a radius of the tip of the fueling gun so as to rotate the operating member while sliding the tip of the fueling gun.

5. The tank opening-closing device according to claim 1, wherein an operating member comprises a pressing part that opens and operates the valve opening-closing mechanism by pressing while sliding a pressed part of the valve opening-closing mechanism.

6. The tank opening-closing device according to claim 1, wherein the retraction mechanism is constituted so as to move the valve body in an axial direction of the gasket, and to open the fueling inlet by moving the valve body in a direction intersecting the axial direction.

7. The tank opening-closing device according to claim 1, wherein the retraction mechanism is constituted so as to open the fueling inlet by moving the valve body following an arc trajectory.

8. The tank opening-closing device according to claim 1, wherein the valve opening-closing mechanism comprises the valve support moving body that supports the valve body to be able to slide in the opening and closing direction, and a supported mechanism that supports the valve support moving body and is fixed on the tank opening forming member to be able to move in the intersecting direction.

9. The tank opening-closing device according to claim 8, wherein the valve support moving body comprises a cantilever spring that reduces sliding resistance at sliding locations with the supported mechanism.

10. The tank opening-closing device according to claim 8, wherein the supported mechanism comprises a return spring that biases the valve support moving body from the fueling position to the closed position.

11. The tank opening-closing device according to claim 1, wherein
    the tank opening forming member comprises an opening for inserting the fueling gun, and
    the retraction mechanism comprises a shutter mechanism that opens and closes the opening by the fueling gun or the external force, and a linking mechanism that works in conjunction with the shutter mechanism and opens and closes the valve opening-closing mechanism.

12. The tank opening-closing device according to claim 11, wherein the linking mechanism comprises an operating member that is separated from the valve opening-closing mechanism in a closed state of the shutter mechanism, and in conjunction with the opening operation of the shutter mechanism, presses the valve opening-closing mechanism to open and operate the valve opening-closing mechanism.

13. The tank opening-closing device according to claim 12, wherein
the operating member comprises an arm and a pressing body fixed to an end of the arm, and
the valve body comprises a pressed part that opens and operates the valve opening-closing mechanism by being pressed by the pressing body.

14. The tank opening-closing device according to claim 1, wherein the retraction mechanism comprises an axis support unit that supports the valve support moving body pivoted at the opening peripheral edge part of the fueling inlet, and a spring for biasing the valve body in the direction that closes the fueling inlet.

15. The tank opening-closing device according to claim 1, wherein the valve opening-closing mechanism comprises a negative pressure valve that opens when the differential pressure of the internal pressure of the fuel tank and outside air exceeds a preset level.

16. The tank opening-closing device according to claim 1, wherein the valve opening-closing mechanism comprises a positive pressure valve and a negative pressure valve for regulating pressure so that the differential pressure between the internal pressure and outside air moves toward being within a preset range.

17. The tank opening-closing device according to claim 2, wherein the operating member includes an operating member main unit and a pressing part projecting from a bottom part of the operating member main unit, wherein the pressing part includes a projection for pressing the valve opening-closing mechanism.

18. The tank opening-closing device according to claim 17, wherein a bottom edge of the pressing part is a curved surface.

19. The tank opening-closing device according to claim 1, wherein the valve opening-closing mechanism is configured to move the valve body in resistance to biasing force of the spring in an axial direction of the gasket and to separate the valve body from the gasket by being pressed by the fueling gun.

20. A tank opening-closing device for opening and closing an inlet for supplying fuel to a fuel tank, comprising:
a tank opening forming member having the inlet and a fuel path for leading the fuel supplied from a fueling gun to the fuel tank through the inlet, the tank opening forming member including an opening for inserting the fueling gun,
a valve opening-closing mechanism including a valve body, a valve support moving body housing the valve body in a movable manner, and a spring for biasing the valve body toward the inlet, wherein the valve body is for opening and closing the inlet and also for regulating an internal pressure of the fuel tank, and the valve body includes a pressed part that opens and operates the valve opening-closing mechanism by being pressed by the pressing body,
a gasket for sealing between the valve body and an opening peripheral edge part by being pressed by the opening peripheral edge part of the inlet and the valve body, and
a retraction mechanism for working in conjunction with the fueling gun or an external force and having the valve opening-closing mechanism selectively move to a closing position and a fueling position, the retraction mechanism including a shutter mechanism that opens and closes the opening by the fueling gun or the external force and a linking mechanism that works in conjunction with the shutter mechanism and opens and closes the valve opening-closing mechanism, the linking mechanism including an operating member that is separated from the valve opening-closing mechanism in a closed state of the shutter mechanism; and the linking mechanism in conjunction with the opening operation of the shutter mechanism, presses the valve opening-closing mechanism to open and operate the valve opening-closing mechanism; the operating member including an arm and a pressing body fixed to an end of the arm, wherein
the closing position is a position for regulating the internal pressure of the fuel tank by the valve body opening and closing the inlet,
the fueling position is a position at which the valve body retracts from the inlet and enables fuel supply,
the operating member comprises a rotation support part pivoted at the tank opening forming member and fixed to an end of the arm, and a sliding body provided between the pressing body and the rotation support part, and
the shutter mechanism comprises a slide guide member provided on the shutter mechanism, wherein the slide guide member works in conjunction with the opening operation of the shutter mechanism and rotates the operating member at the center of the rotation support part to open and operate the valve opening-closing mechanism using the pressing body.

* * * * *